United States Patent
Choi et al.

(10) Patent No.: US 9,961,323 B2
(45) Date of Patent: May 1, 2018

(54) METHOD AND APPARATUS FOR MULTIVIEW VIDEO ENCODING BASED ON PREDICTION STRUCTURES FOR VIEWPOINT SWITCHING, AND METHOD AND APPARATUS FOR MULTIVIEW VIDEO DECODING BASED ON PREDICTION STRUCTURES FOR VIEWPOINT SWITCHING

(71) Applicant: SAMSUNG ELECTRONICS CO., LTD., Suwon-si (KR)

(72) Inventors: Byeong-doo Choi, Siheung-si (KR); Jeong-Hoon Park, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 548 days.

(21) Appl. No.: 14/375,593

(22) PCT Filed: Jan. 30, 2013

(86) PCT No.: PCT/KR2013/000759
§ 371 (c)(1),
(2) Date: Jul. 30, 2014

(87) PCT Pub. No.: WO2013/115562
PCT Pub. Date: Aug. 8, 2013

(65) Prior Publication Data
US 2015/0023430 A1    Jan. 22, 2015

Related U.S. Application Data

(60) Provisional application No. 61/592,581, filed on Jan. 30, 2012.

(51) Int. Cl.
*H04N 19/114* (2014.01)
*H04N 19/187* (2014.01)
(Continued)

(52) U.S. Cl.
CPC ....... *H04N 13/0048* (2013.01); *H04N 19/114* (2014.11); *H04N 19/187* (2014.11); *H04N 19/33* (2014.11); *H04N 19/597* (2014.11)

(58) Field of Classification Search
CPC ............. H04N 13/0048; H04N 19/114; H04N 19/187; H04N 19/33; H04N 19/597
(Continued)

(56) References Cited

U.S. PATENT DOCUMENTS

| | | | |
|---|---|---|---|
| 9,100,659 B2 * | 8/2015 | Pandit | H04N 19/597 |
| 2007/0121722 A1 * | 5/2007 | Martinian | H04N 19/597 375/240.12 |

(Continued)

FOREIGN PATENT DOCUMENTS

| | | |
|---|---|---|
| KR | 10-2004-0065014 A | 7/2004 |
| KR | 10-2009-0083746 A | 8/2009 |

(Continued)

OTHER PUBLICATIONS

Communication dated Aug. 5, 2014, issued by International Searching Authority in counterpart International Patent Application No. PCT/KR2013/000759.

(Continued)

*Primary Examiner* — William C Vaughn, Jr.
*Assistant Examiner* — Joseph A Towe
(74) *Attorney, Agent, or Firm* — Sughrue Mion, PLLC

(57) ABSTRACT

A multiview video decoding method includes receiving a base view image stream of a base viewpoint and additional view image streams of at least two additional viewpoints, restoring base view images by performing motion compensation that references base view anchor pictures of an I-picture type, by using the base view image stream, restoring a view decoding refresh image configured for viewpoint switching for changing a first additional viewpoint, by (Continued)

performing disparity compensation that references at least one of the restored base view images, on a first additional view image stream, and restoring first additional view images of the first additional viewpoint by performing at least one of disparity compensation that references the restored base view images and motion compensation that references restored images of the first additional viewpoint excluding the view decoding refresh image that precedes the restored first additional view images, on the first additional view image stream.

1 Claim, 28 Drawing Sheets

(51) Int. Cl.
*H04N 19/33* (2014.01)
*H04N 13/00* (2018.01)
*H04N 19/597* (2014.01)

(58) Field of Classification Search
USPC .................................................. 375/240.25
See application file for complete search history.

(56) References Cited

U.S. PATENT DOCUMENTS

| | | | |
|---|---|---|---|
| 2008/0170753 A1 | 7/2008 | Park et al. | |
| 2008/0253671 A1 | 10/2008 | Choi et al. | |
| 2009/0185616 A1* | 7/2009 | Pandit | H04N 19/597 375/240.01 |
| 2009/0190662 A1 | 7/2009 | Park et al. | |
| 2010/0020871 A1* | 1/2010 | Hannuksela | H04N 21/438 375/240.12 |
| 2010/0189182 A1* | 7/2010 | Hannuksela | H04N 21/234327 375/240.25 |
| 2011/0012994 A1 | 1/2011 | Park et al. | |
| 2011/0044550 A1* | 2/2011 | Tian | H04N 19/597 382/238 |
| 2011/0085779 A1* | 4/2011 | Hattori | G11B 27/105 386/240 |
| 2011/0142138 A1* | 6/2011 | Tian | H04N 13/0022 375/240.24 |
| 2011/0286530 A1* | 11/2011 | Tian | H04N 21/2365 375/240.25 |
| 2012/0016965 A1* | 1/2012 | Chen | H04N 21/23439 709/219 |
| 2012/0023249 A1* | 1/2012 | Chen | H04N 21/235 709/231 |
| 2012/0044322 A1* | 2/2012 | Tian | H04N 19/597 348/43 |
| 2012/0269275 A1* | 10/2012 | Hannuksela | H04N 13/0048 375/240.25 |

FOREIGN PATENT DOCUMENTS

| | | |
|---|---|---|
| KR | 10-0968204 B1 | 7/2010 |
| KR | 10-2011-0007928 A | 1/2011 |
| KR | 10-2011-00096649 A | 1/2011 |

OTHER PUBLICATIONS

Song et al., "Comments on Common Test Conditions of 3D Video Coding", Dec. 2011, 2 pages total, Gwangju Institute of Science and Technology.

* cited by examiner

CODING UNIT (1010)

METHOD AND APPARATUS FOR MULTIVIEW VIDEO ENCODING BASED ON PREDICTION STRUCTURES FOR VIEWPOINT SWITCHING, AND METHOD AND APPARATUS FOR MULTIVIEW VIDEO DECODING BASED ON PREDICTION STRUCTURES FOR VIEWPOINT SWITCHING

CROSS-REFERENCE TO RELATED APPLICATIONS

This application is a National Stage Entry of PCT/KR2013/000759, filed on Jan. 30, 2013, which claims priority to U.S. provisional patent application No. 61/592,581, filed on Jan. 30, 2012 in the U.S. Patent and Trademark Office, the entire disclosures of which are incorporated herein by reference in their entirety.

TECHNICAL FIELD

The exemplary embodiments relate to encoding and decoding a video according to a multiview video prediction structure for inter-prediction and motion compensation.

DESCRIPTION OF THE RELATED ART

As hardware for reproducing and storing high resolution or high quality video content is being developed and supplied, a need for a video codec for effectively encoding or decoding the high resolution or high quality video content is increasing. According to a conventional video codec, a video is encoded according to a limited encoding method based on a macroblock having a predetermined size.

Image data of a spatial region is transformed into coefficients of a frequency region via frequency transformation. According to a video codec, an image is split into blocks having a predetermined size, discrete cosine transformation (DCT) is performed on each block, and frequency coefficients are encoded in block units, for rapid calculation of frequency transformation. Compared with image data of a spatial region, coefficients of a frequency region are easily compressed. In particular, since an image pixel value of a spatial region is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

A multiview video codec encodes and decodes a base view video and at least one additional view video. Amounts of data of the base view video and the additional view video may be reduced by removing temporal or spatial redundancy and viewpoint redundancy.

SUMMARY

The present invention provides a multiview video encoding method and apparatus, and a multiview video decoding method and apparatus, wherein viewpoint switching is efficiently performed during a multiview video restoring process by suggesting a new multiview video prediction structure.

According to an aspect of an exemplary embodiment, there is provided a multiview video decoding method including receiving a base view image stream of a base viewpoint and additional view image streams of at least two additional viewpoints, restoring base view images by performing motion compensation that references base view anchor pictures of an I-picture type, by using the base view image stream, restoring a view decoding refresh image configured for viewpoint switching for changing a first additional viewpoint among the at least two additional viewpoints, by performing disparity compensation that references at least one of the restored base view images, on a first additional view image stream that corresponds to the first additional viewpoint and is from among the additional view image streams, and restoring first additional view images of the first additional viewpoint by performing at least one of disparity compensation that references the restored base view images and motion compensation that references restored images of the first additional viewpoint excluding the view decoding refresh image that precedes the restored first additional view images according to a reproduction order of the base view images and the first additional view images, on the first additional view image stream.

The restoring of the first additional view images may include, when the first additional view images are divided among viewpoint switching sections and the viewpoint switching sections respectively include at least one view decoding refresh image, restoring the first additional view images by referring to restored images included in a current viewpoint switching section, among the viewpoint switching sections, of a current additional view image in the first additional view images excluding restored images included in a viewpoint switching section that precedes the current viewpoint switching section according to the reproduction order.

The restoring of the view decoding refresh image may include restoring the view decoding refresh image by skipping performing of motion compensation that references a same view image of a same viewpoint as the first additional viewpoint and only performing disparity compensation that references at least one of the restored base view images.

The restoring of the view decoding refresh image may include deleting a restored image of a same viewpoint as the first additional viewpoint, which is stored in a reference picture buffer where at least one reference image of a same viewpoint as the first additional viewpoint is stored, and restoring the view decoding refresh image by only performing disparity compensation that references the at least one of the restored base view images.

The multiview video decoding method may further include, when viewpoint switching occurs while restoring the first additional view images, performing disparity compensation that references a base view image to which a picture order count (POC) where the viewpoint switching occurs is assigned, on a second additional view image stream of a second additional viewpoint among the at least two additional viewpoints, so as to restore a view decoding refresh image of the second additional viewpoint to which the POC where the viewpoint switching occurs is assigned, and restoring second additional view images of the second additional viewpoint by performing at least one of disparity compensation that references the restored base view images and motion compensation that references second additional view images excluding a view decoding refresh image that precedes the second additional view images according to the reproduction order which further indicates a reproduction order of the second additional view images.

The view decoding refresh image of the first additional viewpoint may be an image to which a POC that is the same as a POC of an image configured for random access from among the base view images is assigned.

According to another aspect of an exemplary embodiment, there is provided a multiview video encoding method including generating a base view image stream including residuals of base view images of a base viewpoint that includes base view anchor pictures of an I-picture type, by performing inter-prediction on the base view images of the base viewpoint; performing inter-view prediction that references the base view images of the base viewpoint, on a view decoding refresh image configured for viewpoint switching to switch a first additional viewpoint having first additional view images corresponding to the base view images; and generating a first additional view image stream of the first additional viewpoint, wherein the first additional view image stream includes residuals of the first additional view images generated by performing at least one of inter-view prediction to predict the first additional view images by referring to the base view images, and inter-prediction to predict the first additional view images by referring to first additional view images of a same viewpoint excluding the view decoding refresh image preceding the first additional view images of the same viewpoint according to a reproduction order of the base view image stream and the first additional view image stream.

The generating of the first additional view image stream may include, when the first additional view images are divided among viewpoint switching sections and the viewpoint switching sections respectively include at least one view decoding refresh image, performing inter-prediction on the first additional view images by referring to restored images included in a current viewpoint switching section of a current additional viewpoint in the first additional view images excluding restored images included in a viewpoint switching section that precedes the current viewpoint switching section according to the reproduction order.

The performing of the inter-view prediction on the view decoding refresh image may include skipping performing inter-prediction that references an image of a same viewpoint as the first additional viewpoint and performing only inter-view prediction that references at least one of the base view images.

The performing of the inter-view prediction on the view decoding refresh image may include deleting a restored image of a same viewpoint as the first additional viewpoint, the restored image being stored in a reference picture buffer where at least one reference image of the same viewpoint as the first additional viewpoint is stored, and performing inter-view prediction that references the at least one of the base view images, on the view decoding refresh image.

The multiview video encoding method may further include performing inter-view prediction that references the base view images, on a view decoding refresh image configured for viewpoint switching to switch a second additional viewpoint having second additional view images corresponding to the base view images and the first additional view images, and generating a second additional view image stream of the second additional viewpoint, wherein the second additional view image stream may include residuals of the second additional view images generated by performing at least one of inter-view prediction to predict the second additional view images by referring to the base view images, and inter-prediction to predict the second additional view images by referring to the second additional view images of a same viewpoint as the second additional viewpoint excluding a view decoding refresh image preceding the second additional view images according to the reproduction order which further indicates a reproduction order of the second additional view images.

According to another aspect of an exemplary embodiment, there is provided a multiview video decoding apparatus including a base view image restorer configured to restore base view images including base view anchor pictures of an I-picture type by performing motion compensation that references the base view images, by using a received base view image stream, and an additional view image restorer configured to restore a view decoding refresh image configured for viewpoint switching of a first additional viewpoint by performing disparity compensation that references at least one of the restored base view images, on a first additional view image stream of the first additional viewpoint and from among received additional view image streams, and to restore first additional view images of the first additional viewpoint by performing at least one of disparity compensation that references the restored base view images and motion compensation that references restored images of the first additional viewpoint excluding the view decoding refresh image that precedes the restored first additional view images of the first additional viewpoint according to a reproduction order of the base view images and the first additional view images.

The multiview video decoding apparatus may further include a viewpoint switch configured to, when viewpoint switching occurs while restoring the first additional view images, restore second additional view images of a second additional viewpoint by performing at least one of disparity compensation that references the restored base view images and motion compensation that references the second additional view images excluding an anchor picture that precedes the second additional view images according to the reproduction order which further indicates a reproduction order of the second additional view images, starting from an anchor picture of the second additional viewpoint at a point where the viewpoint switching occurs, by using a second additional view image stream of the second additional viewpoint.

According to another aspect of an exemplary embodiment, there is provided a multiview video encoding apparatus including a base viewpoint encoder configured to generate a base view image stream including residuals of base view images that include base view anchor pictures of an I-picture type, by performing inter-prediction on the base view images, and an additional viewpoint encoder configured to perform inter-view prediction that references the base view images, on a view decoding refresh image configured for viewpoint switching between at least two additional viewpoints including additional view images corresponding to the base view images, and to generate an additional view image stream that includes residuals of the additional view images, wherein the additional view image stream is generated by performing at least one of inter-view prediction to predict the additional view images by referring to the base view images, and inter-prediction to predict the additional view images by referring to additional view images of a same viewpoint excluding a view decoding refresh image preceding the additional view images of the same viewpoint according to a reproduction order of the of the base view images and the additional view images, wherein the additional viewpoint encoder individually encodes the additional view images according to additional viewpoints.

According to another aspect of an exemplary embodiment, there is provided a non-transitory computer-readable recording medium having recorded thereon a program,

DETAILED DESCRIPTION OF THE EXEMPLARY EMBODIMENTS

Hereinafter, a multiview video encoding apparatus, a multiview video decoding apparatus, a multiview video encoding method, and a multiview video decoding method, according to exemplary embodiments, will be described with reference to FIGS. 1A through 7C. Also, a multiview video encoding apparatus, a multiview video decoding apparatus, a multiview video encoding method, and a multiview video decoding method, according to exemplary embodiments, which are based on coding units having a tree structure, will be described with reference to FIGS. 8 through 20. Also, various exemplary embodiments to which a multiview video encoding apparatus, a multiview video decoding apparatus, a multiview video encoding method, and a multiview video decoding method are applicable, will be described with reference to FIGS. 21 through 27. Hereinafter, an 'image' may denote a still image or a moving image of a video, or a video itself.

First, a multiview video encoding apparatus, a multiview video decoding apparatus, a multiview video encoding method, and a multiview video decoding method according to exemplary embodiments will be described with reference to FIGS. 1A through 7C.

Figure 1A:
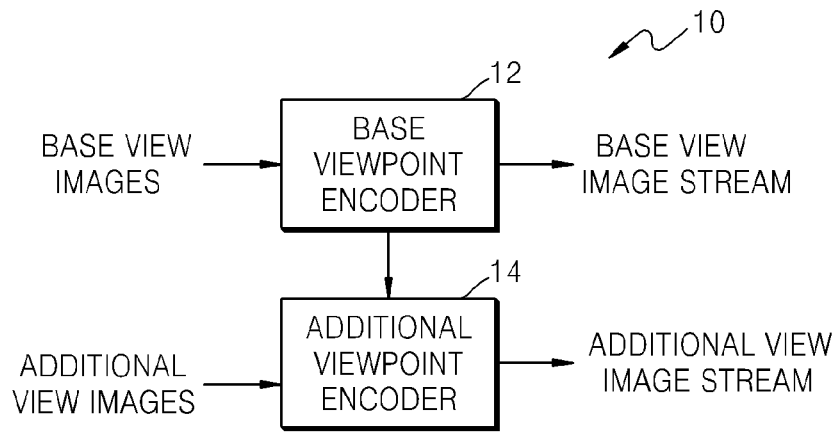
FIG. 1A is a block diagram of a multiview video encoding apparatus according to an exemplary embodiment.
Figure 1B:
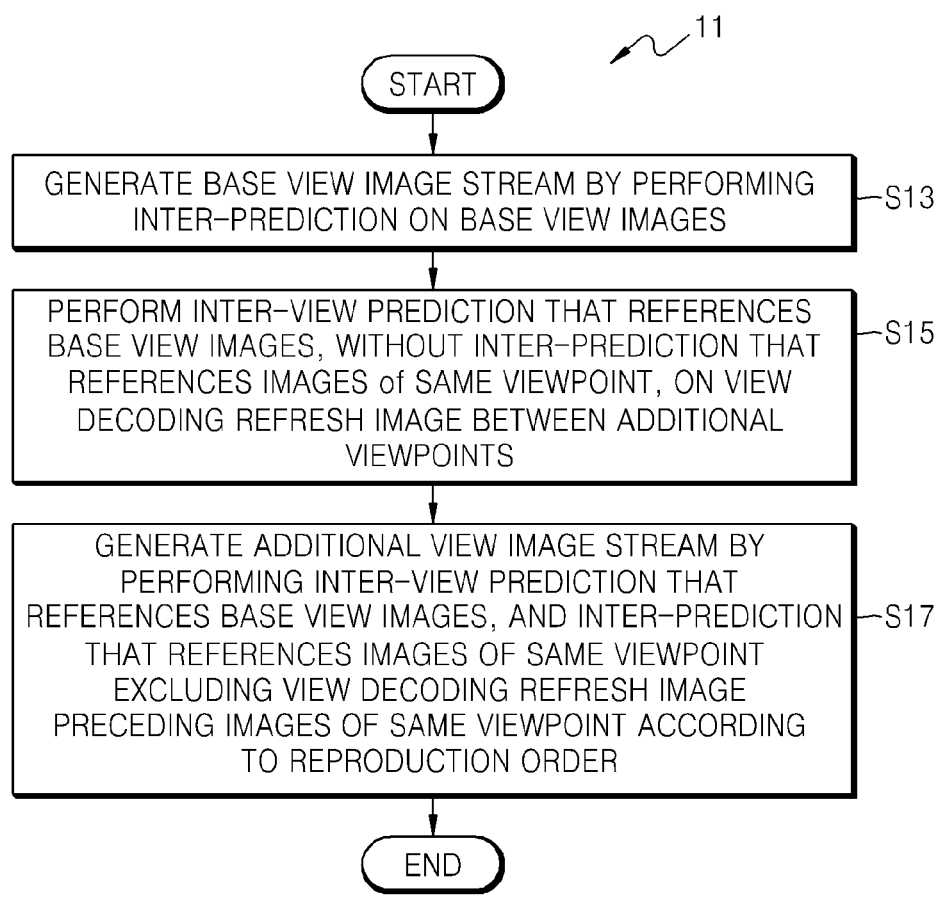
FIG. 1B is a flowchart of a multiview video encoding method of the multiview video encoding apparatus of FIG. 1A.

FIG. 1A is a block diagram of a multiview video encoding apparatus 10 according to an exemplary embodiment. FIG. 1B is a flowchart of a multiview video encoding method 11 of the multiview video encoding apparatus 10 of FIG. 1A.

The multiview video encoding apparatus 10 according to the current exemplary embodiment includes a base viewpoint encoder 12 and an additional viewpoint encoder 14.

The multiview video encoding apparatus 10 encodes base view images and additional view images. For example, central view images, left view images, and right view images are encoded, wherein the central view images may encoded as base view images, the left view images may be encoded as first additional view images, and the right view images may be encoded as second additional view images. An encoding result of the base view images may be output as a base view image stream, and encoding results of the first and second additional view images may be respectively output as a first additional view image stream and a second additional view image stream.

When a number of additional viewpoints is at least three, base view images, and first additional view images of a first additional viewpoint through K-th additional view images of a K-th additional viewpoint may be encoded. Accordingly, an encoding result of the base view images may be output as a base view image stream, and encoding results of the first through K-th additional view images may be respectively output as first through K-th additional view image streams.

The multiview video encoding apparatus 10 may be encoded according to a scalable video coding method. Here, the base view image stream including encoding data of the base view images may be encoded as a base layer image stream, and the additional view image stream including encoding data of the additional view images may be encoded as an improved layer image stream.

The multiview video encoding apparatus 10 may perform encoding according to blocks of each image of a video. A block may have a square shape, a rectangular shape, or an arbitrary geometrical shape, and is not limited to a data unit having a predetermined size. The block according to an exemplary embodiment may be a maximum coding unit, a coding unit, a prediction unit, or a transformation unit, among coding units according to a tree structure. Video encoding and decoding methods based on coding units according to a tree structure will be described later with reference to FIGS. 8 through 20.

The multiview video encoding apparatus 10 may perform inter-prediction between images in which the images are referenced in order to predict images. By performing inter-prediction, a motion vector indicating motion information between a current image and a reference image, and a residual that is a difference component between the current image and the reference image may be generated.

Also, the multiview video encoding apparatus 10 may perform inter-view prediction to predict additional view images by referring to base view images. The multiview video encoding apparatus 10 may perform inter-view prediction for predicting second additional view images by referring to first additional view images. By performing inter-view prediction, a disparity between a current image and a reference image of a viewpoint different than that of the current image and a residual that is a difference component between the current image and the reference image of the different viewpoint may be generated.

Inter-prediction and inter-view prediction may be performed based on a data unit, such as a coding unit, a prediction unit, or a transformation unit.

In operation S13, the base viewpoint encoder 12 generates the base view image stream by encoding the base view images. The base viewpoint encoder 12 may perform inter-prediction between the base view images. The base viewpoint encoder 12 may encode base view anchor pictures of an I-picture type from among the base view images without having to reference other images. The base view anchor picture of the I-picture type may be an instantaneous decoding refresh (IDR) image capable of a random access, a clean random access (CRA) image, or a deferred decoding refresh (DDR) image.

The base viewpoint encoder 12 may perform inter-prediction that references other base view images, on the base view images excluding the base view anchor pictures.

The base viewpoint encoder 12 may generate a residual via the inter-prediction performed on the base view images excluding the base view anchor pictures. Intra-prediction that references adjacent pixels in an image may be performed on the base view anchor pictures. The base viewpoint encoder 12 may generate encoding data by encoding result data obtained by performing inter-prediction or intra-prediction. For example, transformation, quantization, or entropy encoding may be performed on an image block including the result data obtained by performing inter-prediction or intra-prediction.

The base viewpoint encoder 12 may generate the base view image stream including encoding data of the base view anchor pictures and encoding data of the remaining base view images. The base viewpoint encoder 12 may output motion vectors generated via inter-prediction performed on the base view images, together with the base view image stream.

The additional viewpoint encoder 14 generates the additional view image stream by encoding the additional view images. When additional view images of a plurality of additional viewpoints are encoded, the additional viewpoint encoder 14 generates an additional view image stream according to the additional viewpoints by encoding the additional view images according to the additional viewpoints. For convenience of description, encoding operations of the additional viewpoint encoder 14 will be described as operations performed on additional view images of one viewpoint. However, the encoding operations are not performed only on additional view images of one viewpoint, but also on additional view images of another viewpoint.

The additional viewpoint encoder 14 may perform inter-view prediction that references the base view images and inter-prediction that references images of a same viewpoint as the additional viewpoint, so as to encode the additional view images.

A view decoding refresh image according to an exemplary embodiment is an image allowing changing of a reproduction viewpoint so that, while decoding and reproducing additional view images of one of a plurality of additional viewpoints, a reproduction viewpoint may be changed to decode and reproduce additional view images of another one of the plurality of additional viewpoints.

The first additional view images may be divided among at least one viewpoint switching section, and each viewpoint switching section may include at least one view decoding refresh image. Since an additional viewpoint currently being reproduced may be changed whenever a viewpoint switching section is changed, a next viewpoint switching section may be processed only after all pictures included in a viewpoint switching section are reproduced from a view decoding refresh image once a reproduction viewpoint of an additional viewpoint is changed.

A method of prediction-encoding the additional view images in one viewpoint switching section will now be described with reference to operations S15 and S17.

In operation S15, the additional viewpoint encoder 14 may only perform inter-view prediction that references the base view images, on a view decoding refresh image capable of viewpoint switching between at least two additional viewpoints, from among the additional view images corresponding to the base view images.

The additional viewpoint encoder 14 may not allow inter-prediction that references pre-restored images of a same viewpoint, on the view decoding refresh images of the additional view images. Accordingly, the additional viewpoint encoder 14 may only perform inter-view prediction that references the base view images, while skipping inter-prediction that references images of a same viewpoint, on the view decoding refresh images.

Restored images that are referred to in order to predict other images of a same viewpoint may be stored in a reference picture buffer (RPB) according to viewpoints. However, since the additional viewpoint encoder 14 does not reference restored images of a same viewpoint as the additional viewpoint while encoding a view decoding refresh image, restored images stored in the RPB for a current additional viewpoint may be deleted. In other words, the RPB may be flushed.

In operation S17, the additional viewpoint encoder 14 may predict the remaining additional view images excluding the at least one view decoding refresh image.

The additional viewpoint encoder 14 may perform at least one of inter-view prediction and inter-prediction on the additional view images excluding the view decoding refresh image.

The additional viewpoint encoder 14 may perform inter-view prediction on the additional view images by referring to the base view images. The additional viewpoint encoder 14 may perform inter-prediction on the additional view images by referring to the additional view images of the same viewpoint excluding the view decoding refresh image preceding the additional view images of the same viewpoint as the additional viewpoint according to a reproduction order.

The additional viewpoint encoder 14 may predict the additional view images according to the viewpoint switching sections. In other words, the additional viewpoint encoder 14 may not reference an additional view image that is included in a viewpoint switching section that precedes a current viewpoint switching section of a current image according to a reproduction order and is pre-restored, in order to perform inter-prediction on the additional view images.

The additional viewpoint encoder 14 may reference an image that is included in a current viewpoint switching section and pre-restored instead of referring to a current image, in order to perform inter-prediction on the current image. The inter-prediction may be performed on the current image by referring to a view decoding refresh image included in a current viewpoint switching section, even when a picture order count (POC) lower than that assigned to the current image is assigned.

A view decoding refresh image of the first additional viewpoint may be an image having a POC assigned thereto that is the same as a POC assigned to an image capable of being randomly accessed from among the base view images.

A view decoding refresh image may be an I-picture, a P-picture, or a B-picture based on a picture type. Here, a base view image corresponding to the view decoding refresh image may also be an I-picture, a P-picture, or a B-picture.

Accordingly, the additional viewpoint encoder 14 may perform inter-view prediction that references the base view images, on the view decoding refresh image of the first additional view images that correspond to the base view images and may perform one of inter-view prediction and inter-prediction on the remaining first additional view images, according to the viewpoint switching sections. Accordingly, the first additional view image stream including the residuals of the first additional view images may be generated.

Also, the additional viewpoint encoder 14 may perform similar prediction encoding on the second additional view images corresponding to the base view images.

In other words, the additional viewpoint encoder 14 may perform inter-view prediction that references the base view images, on a view decoding refresh image, according to viewpoint switching sections of the second additional view images. Also, the additional viewpoint encoder 14 may perform at least one of inter-view prediction and intra-prediction on the second additional view images excluding the view decoding refresh image. In order to perform inter-prediction on the second additional view images, a restored image in the same viewpoint switching section excluding images in a preceding viewpoint switching section may be referred to. Accordingly, the second additional view image stream including the residuals of the second additional view images may be generated.

The additional viewpoint encoder 14 may output motion vectors generated via inter-prediction on the second additional view images, and disparity information generated via inter-view prediction that references images of other viewpoints, together with the additional view image stream, according to additional viewpoints.

The multiview video encoding apparatus 10 may generate a depth map between multiview images. The multiview video encoding apparatus 10 may generate a depth map indicating an inter-view depth according to a base view image and an additional view image, which correspond to the same scene, from among the base view images and the additional view images. The multiview video encoding apparatus 10 may encode and transmit the depth map, together with the base view image stream and the additional view image stream.

The multiview video encoding apparatus 10 may include a central processor (not shown) for controlling the base viewpoint encoder 12 and the additional viewpoint encoder 14. Alternatively, the base viewpoint encoder 12 and the additional viewpoint encoder 14 may operate by self-processors included therein (not shown), and the self-processors may mutually organically operate such that the multiview video encoding apparatus 10 operates. Alternatively, the base viewpoint encoder 12 and the additional viewpoint encoder 14 may be controlled by an external processor (not shown) of the multiview video encoding apparatus 10.

The multiview video encoding apparatus 10 may include at least one data storage unit (not shown) for storing input and output data of the base viewpoint encoder 12 and the additional viewpoint encoder 14. The multiview video encoding apparatus 10 may include a memory controller (not shown) for controlling data input to or output from the data storage unit.

A multiview video decoding apparatus and a multiview video decoding method of restoring a multiview video image stream prediction-encoded according to the exemplary embodiment described above with reference to FIGS. 1A and 1B will now be described with reference to FIGS. 2A, 2B, 3A, and 3B.

Figure 2A:
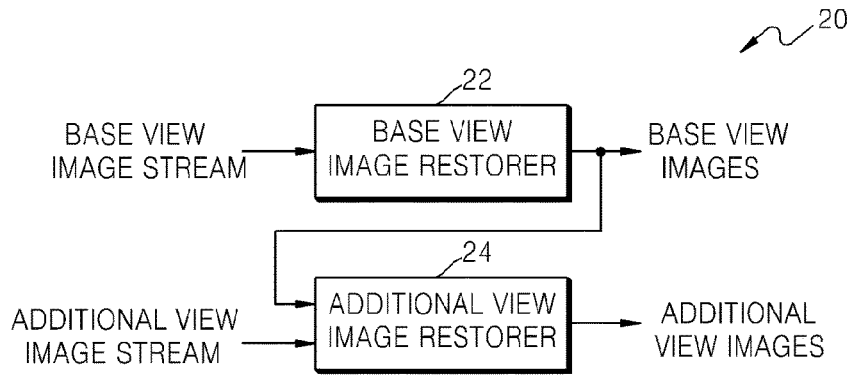
FIG. 2A is a block diagram of a multiview video decoding apparatus according to an exemplary embodiment.
Figure 2B:
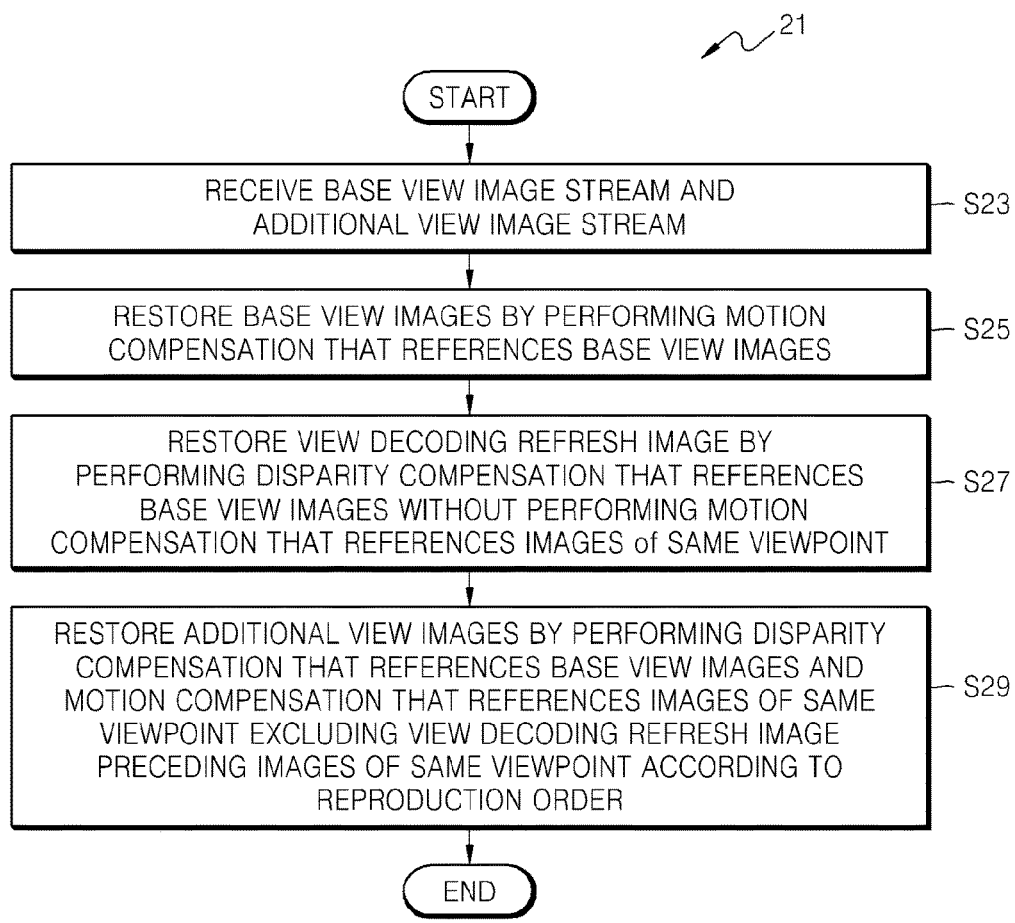
FIG. 2B is a flowchart of a multiview video decoding method of the multiview video decoding apparatus of FIG. 2A.

FIG. 2A is a block diagram of a multiview video decoding apparatus 20 according to an exemplary embodiment. FIG. 2B is a flowchart of a multiview video decoding method 21 of the multiview video decoding apparatus 20 of FIG. 2A.

The multiview video decoding apparatus 20 includes a base view image restorer 22 and an additional view image restorer 24.

The multiview video decoding apparatus 20 receives a base view image stream and an additional view image stream. The multiview video decoding apparatus 20 may receive an image stream in which view images corresponding to a plurality of viewpoints are encoded according to a scalable video coding method. According to the scalable video coding method, a base view image stream including encoding data of base view images may be received as a base layer image stream, and an additional view image stream including encoding data of additional view images may be received as an improved layer image stream.

When the multiview video decoding apparatus 20 uses the scalable video coding method, the multiview video decoding apparatus 20 may decode the base layer image stream to restore the base view images. Also, the multiview video decoding apparatus 20 may selectively decode the improved layer image stream. The additional view images may be restored by decoding the improved layer image stream by referring to encoding symbols and samples restored from the decoding of the base layer image stream.

For example, the multiview video decoding apparatus 20 may restore central view images by decoding a base view image stream, restore left view images by decoding a first additional view image stream, and restore right view images by decoding a second additional view image stream.

When a number of additional viewpoints is at least three, first additional view images of a first additional viewpoint may be restored from a first additional view image stream, second additional view images of a second additional viewpoint may be restored from a second additional view image stream, and K-th additional view images of a K-th additional viewpoint may be restored from a K-th additional view image stream.

The multiview video decoding apparatus 20 may perform decoding according to blocks of each image of a video. A block according to an exemplary embodiment may be a maximum coding unit, a coding unit, a prediction unit, or a transformation unit, from among coding units having a tree structure.

In operation S23, the multiview video decoding apparatus 20 may receive a motion vector generated via inter-prediction and disparity information generated via inter-view prediction, together with a base view image stream and an additional view image stream, which respectively include encoded data of base view images and additional view images.

The multiview video decoding apparatus 20 may restore images by performing motion compensation that mutually references images predicted via inter-prediction of a same viewpoint. Motion compensation is an operation of reconstructing a restored image of a current image in which a motion vector of the current image and a residual of the current image are used in composing a reference image.

The multiview video decoding apparatus 20 may perform disparity compensation which references the base view images so as to restore the additional view images predicted via inter-view prediction. Disparity compensation is an operation of reconstructing a restored image of a current image by composing a reference image of a different viewpoint, which is determined by using disparity information of the current image, and a residual of the current image.

The multiview video decoding apparatus 20 may perform disparity compensation for restoring second additional view images predicted by referring to first additional view images.

Restoration may be performed through inter-motion compensation and inter-view disparity compensation, based on a coding unit or prediction unit.

In operation S25, the base view image restorer 22 may restore the base view images via motion compensation that mutually references the base view images.

The base view image restorer 22 restores the base view images by decoding the received base view image stream. In detail, entropy decoding, inverse quantization, and inverse transformation may be performed on symbols extracted by parsing the base view image stream so as to restore the residuals of the base view images.

The base view image restorer 22 may directly receive an image stream of quantized transformation coefficients of the base view images. The residuals of the base view images may be restored by performing inverse quantization and inverse transformation on the quantized transformation coefficients.

The base view image restorer 22 may restore a base view anchor picture of an I-picture type by decoding a quantized transformation coefficient of the base view anchor picture from among the base view image stream. The base view image restorer 22 may restore the base view anchor pictures of an I-picture type from among the base view images without referring to other base view images of a different viewpoint. The base view image restorer 22 may restore pixels of blocks of the base view anchor picture of an I-picture type via intra prediction using adjacent pixels of a current block in the same picture. The base view anchor pictures of an I-picture type may be configured as an IDR image capable of a random access, a CRA image, or a DDR image.

Also, the base view image restorer 22 may restore the base view images via motion compensation that references the other base view images, with respect to the base view images excluding the base view anchor picture. The base view image restorer 22 may restore the residuals of the base view images excluding the base view anchor picture and determine a reference image from among the base view images so as to compensate the reference image for the residuals, thereby restoring the base view images.

The additional view image restorer 24 restores the additional view images by decoding the additional view image stream. In detail, residuals according to blocks may be restored by performing entropy encoding, inverse quantization, and inverse transformation on symbols extracted by parsing the additional view image stream. The additional view image restorer 24 may directly receive an image stream of quantized transformation coefficients of the residuals, and restore the residuals by performing inverse quantization and inverse transformation on the image stream.

The additional view image restorer 24 may restore the additional view images via inter-view prediction that references the base view images restored from the base view image stream, and inter-prediction that references images of the same viewpoint, in order to decode the additional view image stream.

The additional view image restorer 24 may restore the additional view images via inter-view disparity compensation that references the base view images restored by the base view image restorer 22. According to other cases, current additional view images may be restored via inter-view disparity compensation that references images of another additional viewpoint different from a current additional viewpoint, as well as the base view images.

In detail, the additional view image restorer 24 may obtain disparity information and residuals of the additional view images by decoding the additional view image stream. The additional view image restorer 24 may restore the additional view images by determining a reference image from the images of the other additional viewpoint by using the disparity information, and compensate the reference image for the residuals.

Alternatively, the additional view image restorer 24 may restore the additional view images by performing motion compensation that references additional view images of the same viewpoint.

In detail, the additional view image restorer 24 may obtain motion vectors and residuals of the additional view images by decoding the additional view image stream. The additional view image restorer 24 may determine a reference image from among images of the same viewpoint by using the motion vectors, and compensate the reference image for the residuals so as to restore the additional view images. A reference block may be determined from a reference image by using a motion vector of a current block of a current image.

However, in operation S27, the additional view image restorer 24 may restore a view decoding refresh image capable of viewpoint switching among a first additional viewpoint image by performing disparity compensation that references at least one of the base view images restored by the base view image restorer 22, on a first additional view image stream in the additional view image stream.

In other words, the additional view image restorer 24 may only perform disparity compensation that references the base view images, without having to perform motion compensation that references other images of the same viewpoint, in order to restore the respective view decoding refresh images of the first additional view images.

Restored images that may be referred to so as to predict other images of the same viewpoint may be stored in an RPB according to viewpoints. However, the additional view image restorer 24 may delete the restored images stored in the RPB and flush (e.g., delete) the RPB while decoding the view decoding refresh image of the first additional viewpoint. Since the restored images of the same viewpoint are not referred to while decoding the view decoding refresh image, the view decoding refresh image is satisfactorily decoded even when the RPB is flushed.

In operation S29, the additional view image restorer 24 may restore the first additional view images instead of the view decoding refresh image by performing at least one of disparity compensation that references the base view images and motion compensation that references images of the same viewpoint, on the first additional view image stream in the additional view image stream.

Also, the additional view image restorer 24 may perform motion compensation by referring to images of the same viewpoint, excluding a view decoding refresh image that precedes the image of the same viewpoint according to a reproduction order of images, while restoring the first additional view images. For example, a view decoding refresh image located immediately before a current additional view image, from among view decoding refresh images of an additional viewpoint that is the same as a viewpoint of an image adjacent to the current additional view image according to a reproduction order, may not be used as a reference image.

In detail, the additional viewpoint encoder 14 may predict additional view images according to viewpoint switching sections. Each viewpoint switching section may include at least one view decoding refresh image, and in one viewpoint switching section, restoration starts from a view decoding refresh image and other images may be restored by referring to the restored view decoding refresh image.

However, the additional view image restorer 24 may be unable to perform motion compensation that references a restored image in another viewpoint switching section even if the restored image precedes a current image according to a reproduction order, from among the additional view images of the same viewpoint. In other words, an image restored before a current image and included in a viewpoint switching section before a current viewpoint switching section of the current image may not be referred to while performing motion compensation on the current image, from among the first additional view images.

In detail, the view decoding refresh image which precedes the current image with respect to the reproduction order may be included in the viewpoint switching section preceding the current viewpoint switching section of the current image. Accordingly, the additional view image restorer 24 may perform motion compensation by referring to images excluding the view decoding refresh image preceding the current image according to the reproduction order while performing inter-prediction by referring to other images in the first additional view images of the same viewpoint.

The additional view image restorer 24 may reference an image restored before the current image and included in the current viewpoint switching section, so as to perform motion compensation on the current image. Even when a POC lower than that assigned to the current image is assigned to a view decoding refresh image included in the current viewpoint switching section, the view decoding refresh image may be restored before the current image. Accordingly, motion compensation may be performed on the current image by referring to the view decoding refresh image included in the current viewpoint switching section.

The second additional view images may be restored from the second additional view image stream in a manner similar to that in which the first additional view images are restored from the first additional view image stream.

Also, the multiview video decoding apparatus 20 may receive a depth map indicating an inter-view depth between a base view image and an additional view image regarding the same scene, from among the base view images and the additional view images, together with the base view image stream and the additional view image stream. The additional view image restorer 24 may restore the additional view images based on the base view images by using the depth map, instead of performing disparity compensation that references the base view images.

Operations of the multiview video decoding apparatus 20 for restoring the additional view images by changing a reproduction viewpoint from the first additional viewpoint to the second additional viewpoint will now be described with reference to FIGS. 3A and 3B.

Figure 3A:
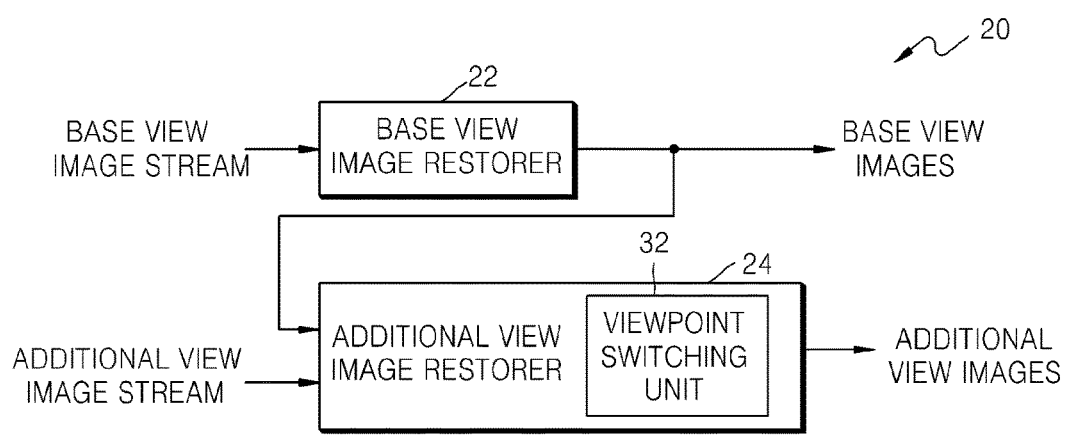
FIG. 3A is a detailed block diagram of the multiview video decoding apparatus of FIG. 2A.

FIG. 3A is a detailed block diagram of the multiview video decoding apparatus 20 of FIG. 2A. FIG. 3B is a flowchart of a multiview video decoding method 31 of the multiview video decoding apparatus 20 of FIG. 3A.

The additional view image restorer 24 may include a viewpoint switching unit 32 (e.g., viewpoint switch). When viewpoint switching is performed while the additional view image restorer 24 restores the first additional view images by using the first additional view image stream, the additional view image restorer 24 may use (e.g., call up) the viewpoint switching unit 32.

The viewpoint switching unit 32 may restore the second additional view images from a view decoding refresh image of the second additional viewpoint to which a POC where viewpoint switching occurred is assigned, by using the second additional view image stream.

In detail, since the multiview video decoding apparatus 20 may restore the additional view images according to the viewpoint switching sections, an additional viewpoint that is currently reproduced may be changed to another additional viewpoint when a viewpoint switching section is changed. Once a reproduction viewpoint of an additional viewpoint is changed, the multiview video decoding apparatus 20 starts to restore a view decoding refresh image of the changed additional viewpoint, and continues to restore current additional view images included in a next viewpoint switching section or restores additional view images of a different additional viewpoint by changing a reproduction viewpoint, only after images included in the same viewpoint switching section as the view decoding refresh image of the changed additional viewpoint are all restored.

Operations S23 through S29 may be the same as those described above with reference to FIG. 2B.

When viewpoint switching occurs while the additional view image restorer 24 restores the first additional view images by using the first additional view image stream in operation S29, operation S33 is performed.

In operation S33, the viewpoint switching unit 32 may start to restore the second additional view images from the view decoding refresh image of the second additional viewpoint to which a POC where the viewpoint switching occurred is assigned.

The viewpoint switching unit 32 may restore the second additional view images by performing at least one of disparity compensation that references the restored base view images and motion compensation that references the second additional view images.

However, the viewpoint switching unit 32 may only perform disparity compensation that references the base view images in order to restore the view decoding refresh image of the second additional viewpoint.

The viewpoint switching unit 32 may perform motion compensation by referring to images excluding a view decoding refresh image preceding a current image according to a reproduction order of images, for the second additional view images excluding the view decoding refresh image.

Also, the viewpoint switching unit 32 may not need to reference images included in a viewpoint switching section preceding the current viewpoint switching section of the current image, in order to perform motion compensation on the second additional view images excluding the view decoding refresh image.

Accordingly, the viewpoint switching unit 32 may not need to reference the second additional view images that are restored at a point in time occurring before a point when viewpoint switching occurred, e.g., before the view decoding refresh image included in the current viewpoint switching section. Accordingly, even when there are no second additional view images restored before the viewpoint switching, reference images for disparity compensation or motion compensation of the second additional view images included in the current viewpoint switching section may be all restored. Accordingly, the viewpoint switching unit 32 may restore the second additional view images starting from the view decoding refresh image of the second additional viewpoint included in the current viewpoint switching section after the viewpoint switching. Accordingly, the additional view images may be restored by changing a viewpoint without a decoding error or an image loss, even when viewpoint switching occurs while restoring the additional view images.

The multiview video decoding apparatus 20 may include a central processor (not shown) for controlling the base view image restorer 22 and the additional view image restorer 24 in general. Alternatively, the base view image restorer 22 and the additional view image restorer 24 may operate by self-processors included therein (not shown), and the self-processors may mutually organically operate such that the multiview video decoding apparatus 20 operates in general. Alternatively, the base view image restorer 22 and the additional view image restorer 24 may be controlled by an external processor (not shown) of the multiview video decoding apparatus 20.

The multiview video decoding apparatus 20 may include at least one data storage unit (not shown) for storing input and output data of the base view image restorer 22 and the additional view image restorer 24. The multiview video decoding apparatus 20 may include a memory controller (not shown) for controlling data input to or output from the data storage unit.

According to the multiview encoding apparatus 10, a multiview video prediction structure is suggested wherein images included in a viewpoint switching section restored before a current viewpoint switching section of a current image are not referred to so that inter-prediction on additional view images is performed. Accordingly, an additional view image stream generated according to the multiview video prediction structure of the multiview video encoding apparatus 10 is capable of inter-prediction even when there is no anchor picture at a point immediately before a point where viewpoint switching occurred.

According to the multiview video decoding apparatus 20, images included in a viewpoint switching section restored before a current viewpoint switching section of a current image are not referred to even when a viewpoint is changed to a second additional viewpoint while restoring first additional view images. Accordingly, second additional view images may be restored without a decoding error or an image loss, since all reference images required to perform motion compensation on images to be first restored after viewpoint switching to the second additional viewpoint are obtained.

Figure 4:
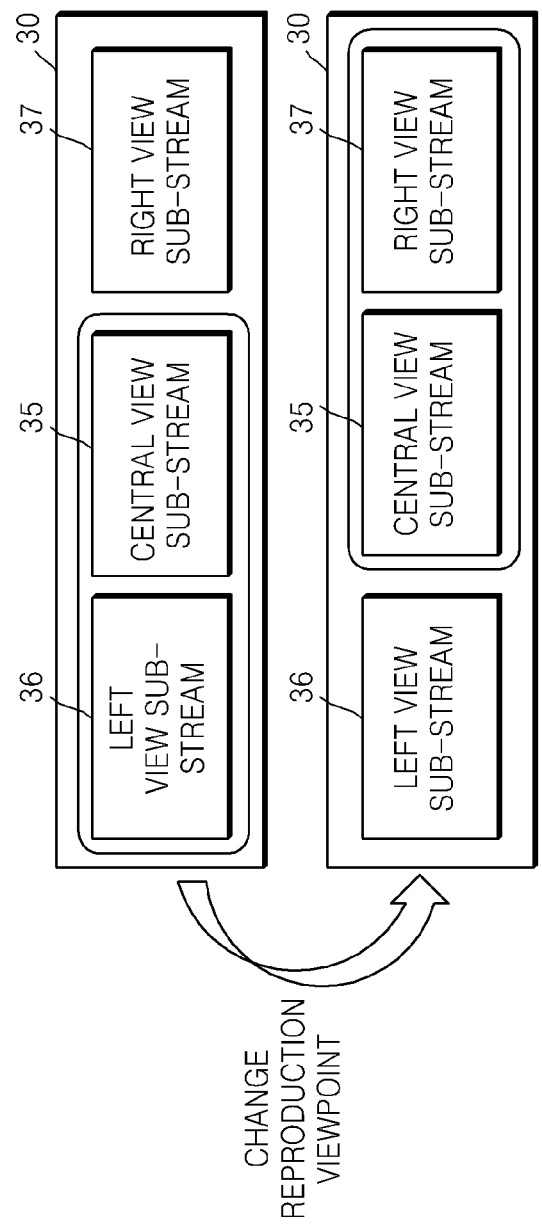
FIG. 4 is a diagram of a multiview video image stream.

FIG. 4 is a diagram of a multiview video image stream 30.

The multiview video image stream 30 includes a central view sub-stream 35, a left view sub-stream 36, and a right view sub-stream 37.

The central view sub-stream 35 includes a bitstream generated by encoding central view images. The left view sub-stream 36 includes a bitstream generated by encoding left view images. The right view sub-stream 37 includes a bitstream generated by encoding right view images.

In order to decode a video of desired viewpoints, only sub-streams of certain viewpoints may be extracted from the multiview video image stream 30, decoded, and reproduced without having to decode sub-streams of all viewpoints. Also, since the multiview video image stream 30 includes image streams of a plurality of viewpoints, reproduction viewpoints may be selected.

For example, when a central view video and a left view video are selected to be reproduced, only the central view sub-stream 35 and the left view sub-stream 36 may be extracted and decoded from the multiview video image stream 30.

Also, a viewpoint may be changed to reproduce the central view video and a right view video while reproducing the central view video and the left view video. In this case, the central view sub-stream 35 and the left view sub-stream 36 are extracted and decoded from the multiview video image stream 30, and after a reproduction viewpoint is changed, the central view sub-stream 35 and the right view sub-stream 37 may be extracted and decoded.

According to related technologies, a point where a reproduction viewpoint is changed is limited to a random access point in an IDR image or a CRA image.

A prediction structure in the related technologies in which the point where the reproduction viewpoint is changed is limited to the random access point in an IDR image or a CRA image will now be described with reference to FIGS. 5A, 5B, 6A, and 6B.

Figure 5A:
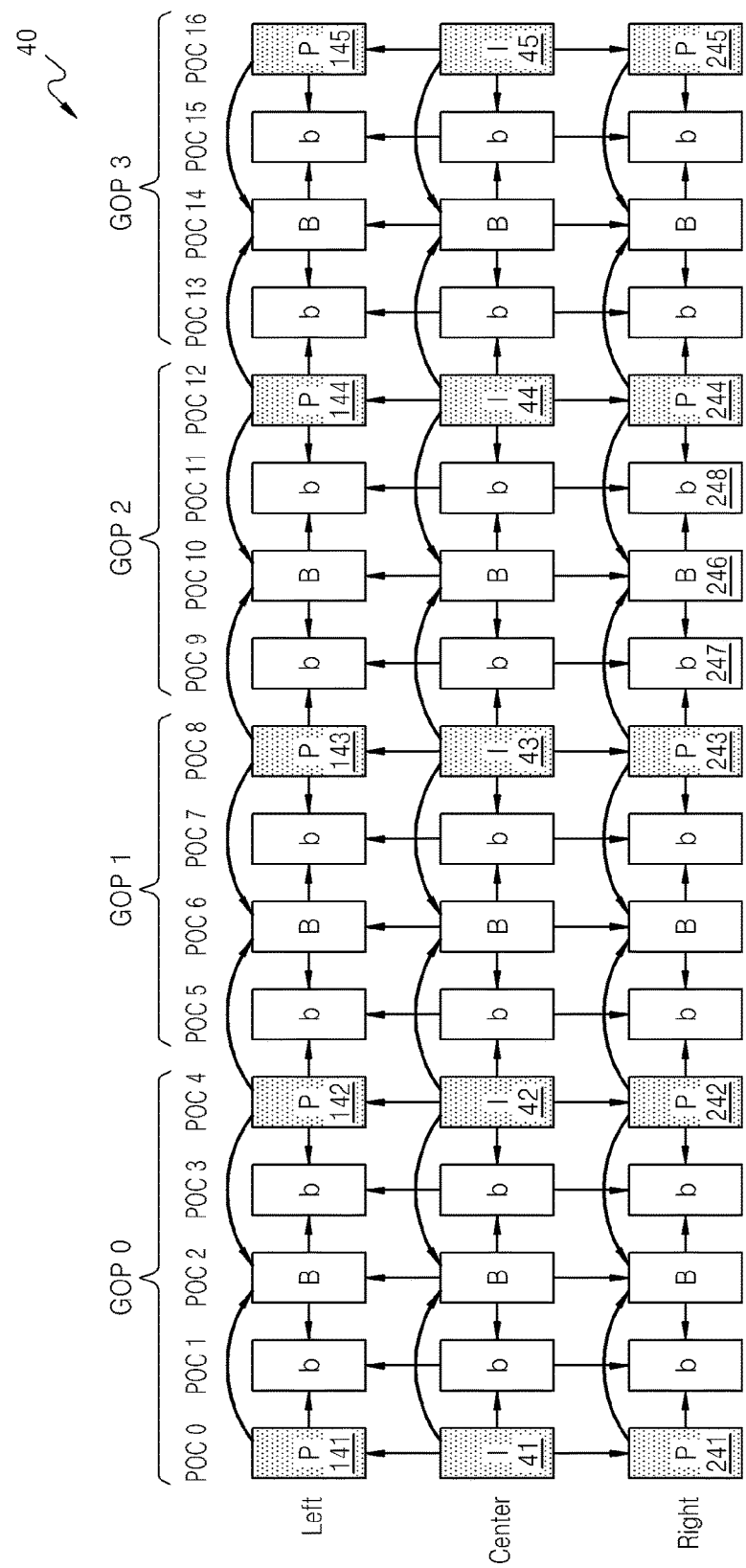
FIGS. 5A, 5B and 5C illustrate a reproduction order and encoding orders of a multiview video prediction structure according to related technologies.
Figure 5B:
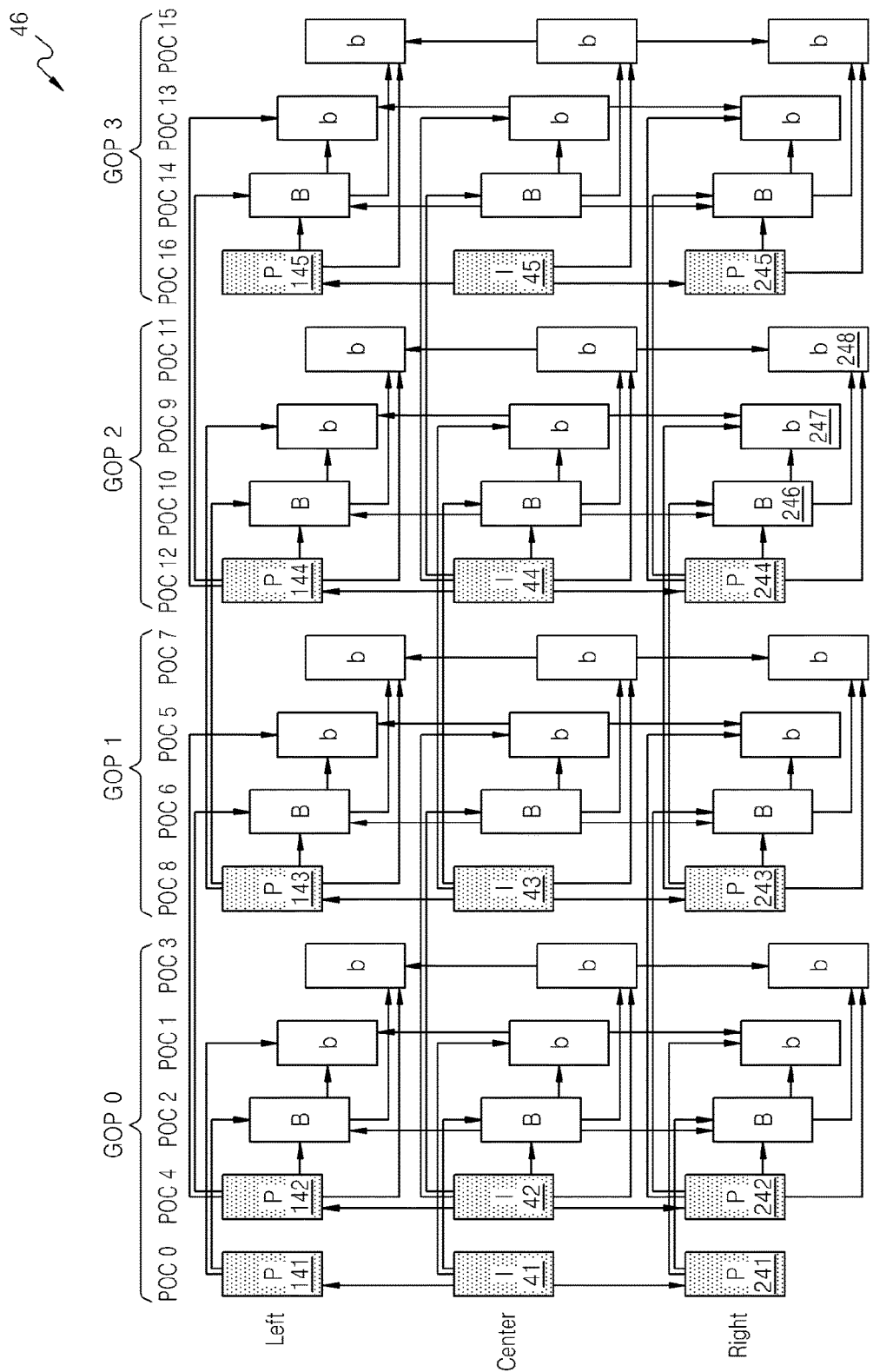
Figure 5C:
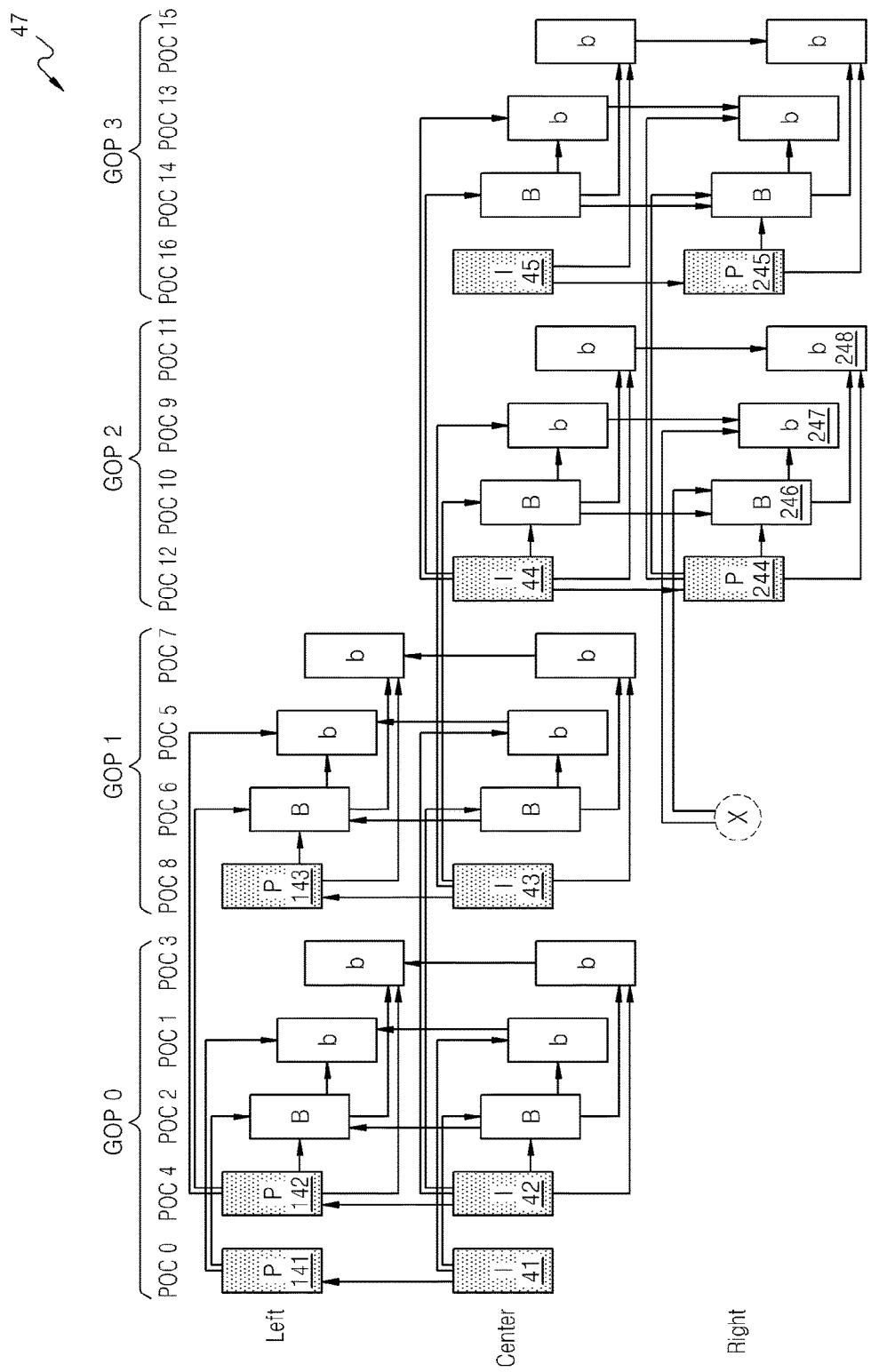

FIGS. 5A through 5C illustrate a reproduction order 40 and encoding orders 46 and 47 of a multiview video prediction structure according to related technologies.

According to the reproduction order 40 and the encoding order 46, images of the same viewpoint are arranged in a horizontal direction. Accordingly, left view images indicated 'Left' are arranged in a line in a horizontal direction, base view images indicated 'Center' are arranged in a line in a horizontal direction, and right view images indicated 'Right' are arranged in a line in a horizontal direction. The base view images may be central view images compared to the left and right view images.

Also, images having the same POC order are arranged in a vertical direction. A POC order indicates a reproduction order of images forming a video. 'POC X' indicated in the reproduction order 40 indicates a relative reproduction order of images in a corresponding column, wherein a reproduction order is fast when a value of X is low, and is slow when the value of X is high.

Thus, according to the reproduction order 40, the left view images indicated 'Left' are arranged in the horizontal direction according to the POC order (reproduction order), the base view images indicated 'Center' are arranged in the horizontal direction according to the POC order (reproduction order), and the right view images indicated 'Right' are arranged in the horizontal direction according to the POC order (reproduction order). Also, the left view image and the right view image located on the same column as the base view image have different viewpoints but have the same POC order (reproduction order).

Four consecutive images form one group of pictures (GOP) according to viewpoints. Each GOP includes images between consecutive anchor pictures, and one anchor picture (key picture). Here, an anchor picture is a CRA image.

An anchor picture is a random access point, and when a reproduction location is arbitrarily selected from images arranged according to a reproduction order, e.g., a POC order, while reproducing a video, an anchor picture closest to the reproduction location according to the POC order is reproduced. The base view images include base view anchor pictures 41 through 45, the left view images include left view anchor pictures 141 through 145, and the right view images include right view anchor pictures 241 through 245.

Multiview images may be reproduced and predicted (restored) according to a GOP order. First, according to the reproduction order 40 of FIG. 5A, images included in GOP 0 may be reproduced, and then images included in GOP 1 may be reproduced, according to viewpoints. In other words, images included in each GOP may be reproduced in an order of GOP 0, GOP 1, GOP 2, and GOP 3. Also, according to the encoding order 46 of FIG. 5B, images included in GOP 0 are predicted (restored), and then images included in GOP 1 may be predicted (restored), according to viewpoints. In other words, images included in each GOP may be predicted (restored) in an order of GOP 0, GOP 1, GOP 2, and GOP 3.

According to the reproduction order 40 and the encoding order 46, inter-view prediction and inter-prediction are performed on images. In the reproduction order 40, an image where an arrow starts is a reference image, and an image where an arrow ends is an image predicted by using a reference image.

In detail, in the encoding order 46, images are arranged in a horizontal direction according to a prediction (restoration) order. In other words, images located relatively to the left are images that are pre-predicted (pre-restored), and images located relatively to the right are images that are post-predicted (post-restored). Since images that follow pre-restored images are predicted (restored) by referring to the pre-restored images, arrows indicating a prediction direction of images of the same viewpoint all point in a direction from images relatively on the left toward images relatively on the right in the encoding order 46.

A prediction result of base view images may be encoded and then output as a base view image stream, and a prediction result of additional view images may be encoded and then output as an additional view image stream. Also, a prediction encoding result of left view images may be output as a first additional view image stream, and a prediction encoding result of right view images may be output as a second additional view image stream.

Only inter-prediction is performed on the base view images. In other words, the base view anchor pictures 41 through 45 of an I-picture type are not predicted by referring to other images, but images of B- and b-picture types are predicted by referring to other base view images. Images of a B-picture type are predicted by referring to an anchor picture of an I-picture type, which precedes the images of a B-picture type according to a POC order, and a following anchor picture of an I-picture type. Images of a b-picture type are predicted by referring to an anchor picture of an I-picture type, which precedes the image of a b-picture type according a POC order, and a following image of a B-picture type, or by referring to an image of a B-picture type, which precedes the images of a b-picture type according to a POC order, and a following anchor picture of an I-picture type.

Inter-view prediction that references base view images, and inter-prediction that references images of the same viewpoint are performed on left view images and right view images.

Like the base view images, inter-prediction is performed on the left view images and inter-prediction is performed on the right view images. The left and right view anchor pictures 141 through 145 and 241 through 245 of the left and right view images do not reference images of the same viewpoint, but the remaining images are predicted by referring to the images of the same viewpoint.

However, the left and right anchor pictures 141 through 145 and 241 through 245 of the left and right view images are also images of a P-picture type, which reference the base view anchor pictures 41 through 45 having the same POC order.

Since not only inter-prediction, but also inter-view prediction that references base view images having the same POC may be performed on the left and right view images excluding the left and right view anchor pictures 141 through 145 and 241 through 245, the left and right view images excluding the left and right view anchor pictures 141 through 145 and 241 through 245 are images of a B- or b-picture type.

Restoration processes for reproducing images are similar to prediction processes. However, each image may be restored by using a restored reference image only after a reference image of each image is restored.

First, the base view images may be restored via inter-motion compensation. When the base view anchor pictures 41 through 45 of an I-picture type are restored, base view images of a B-picture type may be restored via inter-motion compensation that references the base view anchor pictures 41 through 45. Also, base view images of a b-picture type may be restored via inter-motion compensation that references base view restored images of an I- or B-picture type.

The left view images and the right view images are encoded via inter-view prediction that references the base view images and inter-prediction that references the images of the same viewpoint.

In other words, in order to restore the left view images, reference images of a base viewpoint and reference images of a left viewpoint are restored, and then the left view images may be restored via inter-view disparity compensation that references the restored reference images of a base viewpoint and inter-motion compensation that references the restored reference images of a left viewpoint.

Also, in order to restore the right view images, reference images of a base viewpoint and reference images of a right viewpoint are restored, and then the right view images may be restored via inter-view disparity compensation that references the restored reference images of a base viewpoint and inter-motion compensation that references the restored reference images of a right viewpoint.

In order to restore additional view images during decoding processes of a multiview video, base view images are referred to, and thus, the base view images may be restored before the additional view images. Viewpoint switching may be performed while restoring the additional view images while referring to the restored base view images. For example, viewpoint switching may be performed to restore the right view images while restoring the left view images.

The encoding order 47 of FIG. 5C shows an encoding order when viewpoint switching occurs to restore the right view images while restoring the left view images. Here, it is assumed that viewpoint switching occurs after restoring the left view images of GOP 0 and GOP 1. The left view images are restored up to GOP 1, and the right view images are restored from GOP 2. However, since the right view images of GOP 1 are not restored, a right view anchor picture 243 is not restored. Accordingly, motion compensation is impossible to be performed on right view images 246 and 247 of GOP 2, which are predicted by referring to the right view anchor picture 243, and thus, the right view images 246 and 247 are not restored. Also, since the right view image 246 of GOP 2 of a B-picture type is not restored, a right view image 248 of a b-picture type, which is predicted by referring to the right view image 246, is not restored. Accordingly, when inter-prediction is performed by referring to an image in a preceding GOP, images immediately after the viewpoint switching during the decoding processes may not be completely restored. Also, images that were predicted by referring to an anchor picture of a POC preceding a point where viewpoint switching occurred, from among images to be restored immediately after the viewpoint switching, may be unable to be restored.

Figure 6:
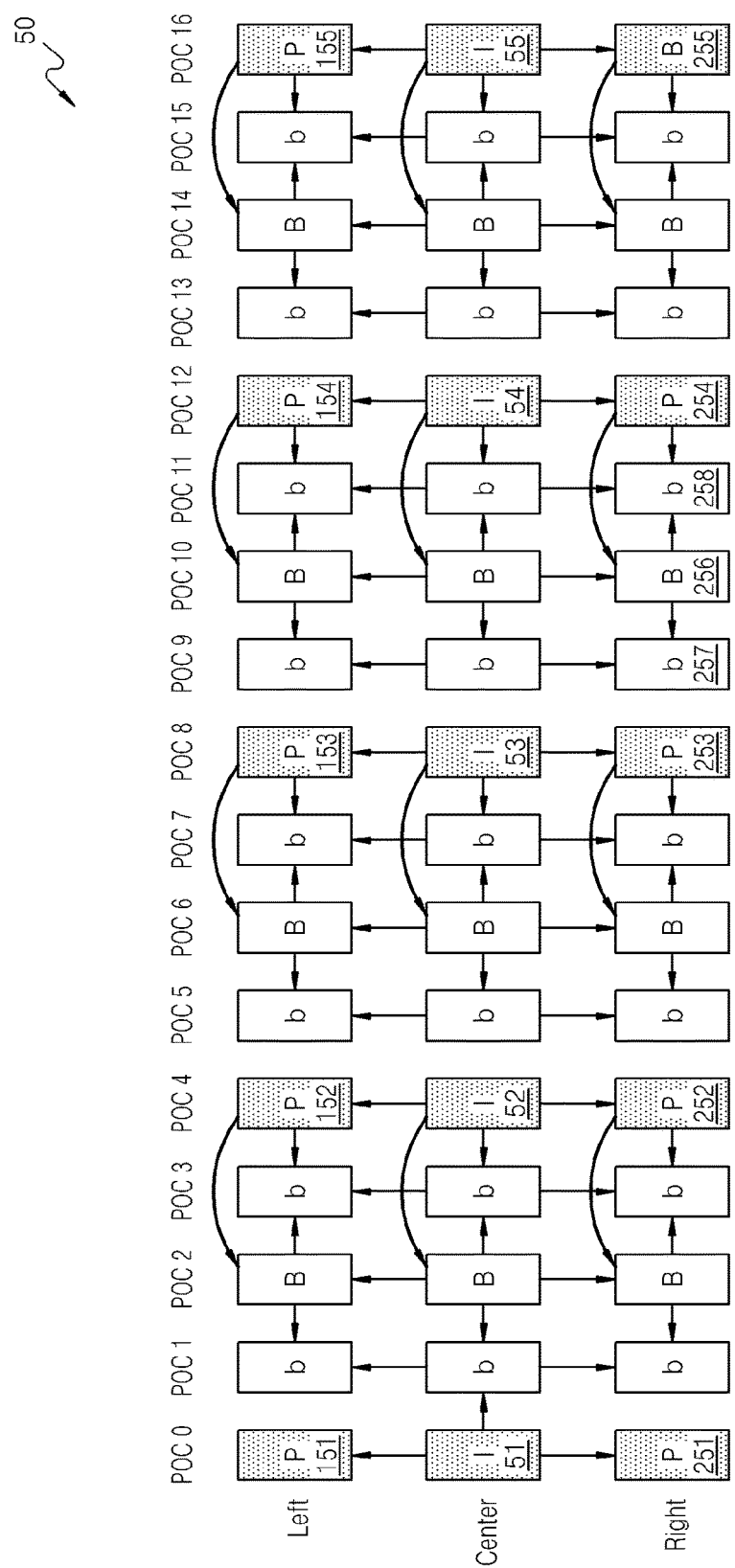
FIG. 6 illustrates a reproduction order of a multiview video prediction structure according to another related technology.

FIG. 6 illustrates a reproduction order 50 of a multiview video prediction structure according to another related technology.

A method of performing inter-view prediction on left view images and right view images are as described above with reference to FIG. 5A. Inter-view prediction may be performed on left view anchor pictures 151 through 155 and right view anchor pictures 251 through 255, by referring to base view anchor pictures 51 through 55 having the same POC order. Also, inter-view prediction that references images having the same POC but different viewpoints may be performed on the left and right view images excluding the left and right view anchor pictures 151 through 155 and 251 through 255.

The multiview video prediction structure of FIG. 6 is different from that of FIG. 5A with respect to when inter-prediction is performed on the left and right view images.

In the multiview video prediction structure of FIG. 6, an anchor picture is a random access image, such as an IDR image, according to viewpoints. An IDR image does not reference an anchor picture of another GOP for inter-prediction.

Each of the left and right view images is not predicted by referring to an anchor picture that precedes the current additional view image according to a reproduction order and is among additional view images of the same viewpoint. In other words, in order to perform inter-prediction on a current additional view image, additional view images excluding an additional view anchor picture that precedes the current additional view image according to a reproduction order may be referred to.

Also, in order to perform inter-prediction on a current left view image, prediction may be performed by referring to a left view image that is in a current GOP but is to be restored at a point in time before the current left view image, without referring to a left view image in a GOP before the current GOP of the current left view image. The same process is applied to a right view image.

In a case in which viewpoint switching occurs after left view images of GOP 0 and GOP 1 are restored, since right view images 256 and 257 of GOP 2 are not predicted by referring to a right view anchor picture 253 of GOP 1 while restoring GOP 2 after viewpoint switching, even if right view images of GOP 1 are not restored, the right view images 256 and 257 may be restored via motion compensation that references right view anchor picture 254 of GOP 2 that is the same GOP. Also, since the right view image 256 of a B-picture type of GOP 2 is restored, a right view image 258 of a b-picture type, which is predicted by referring to the right view image 256, may also be restored.

Thus, according to the multiview video prediction structure of FIG. 6, even when a viewpoint is changed at a point where a GOP changes in order to restore additional view images, additional view images immediately after the viewpoint switching may be restored without a decoding error or an image loss.

However, according to the multiview video prediction structure of FIG. 6, not only anchor pictures of base view images, but also anchor pictures of all additional view images are IDR images. Since an IDR image is not prediction-encoded by referring to another image of the same viewpoint, data compression efficiency may be decreased and encoding efficiency may deteriorate.

Thus, one or more exemplary embodiments provide a multiview video prediction structure that does not decrease encoding efficiency of multiview video images and that does not have a decoding error or a frame loss even when viewpoint switching is performed while reproducing additional view images by decoding an additional view bitstream. A multiview video prediction structure according to an exemplary embodiment, and multiview video encoding and decoding methods using the multiview video prediction structure, according to exemplary embodiments, will now be described with reference to FIGS. 7A through 7C.

Figure 7A:
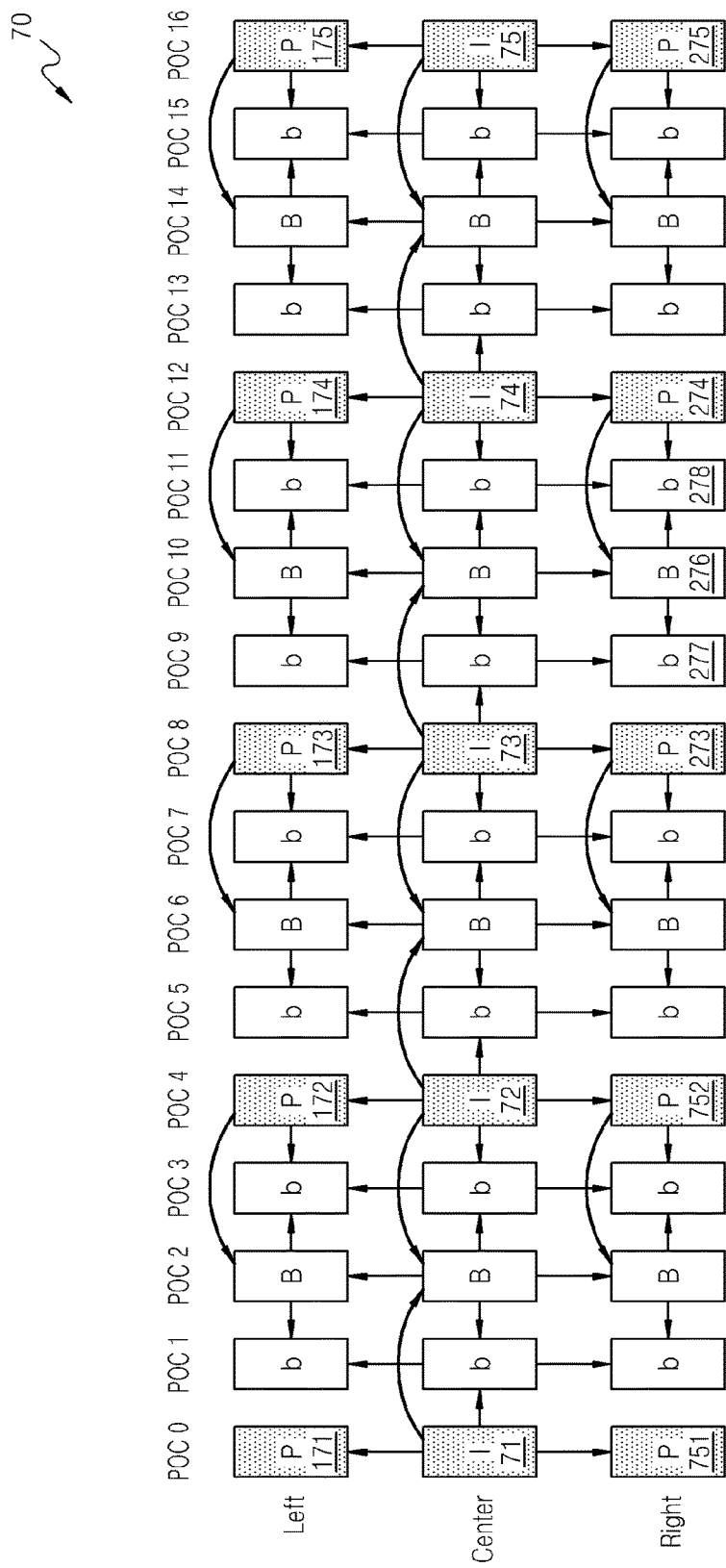
FIG. 7A illustrates a reproduction order of a multiview video prediction structure according to an exemplary embodiment.
Figure 7B:
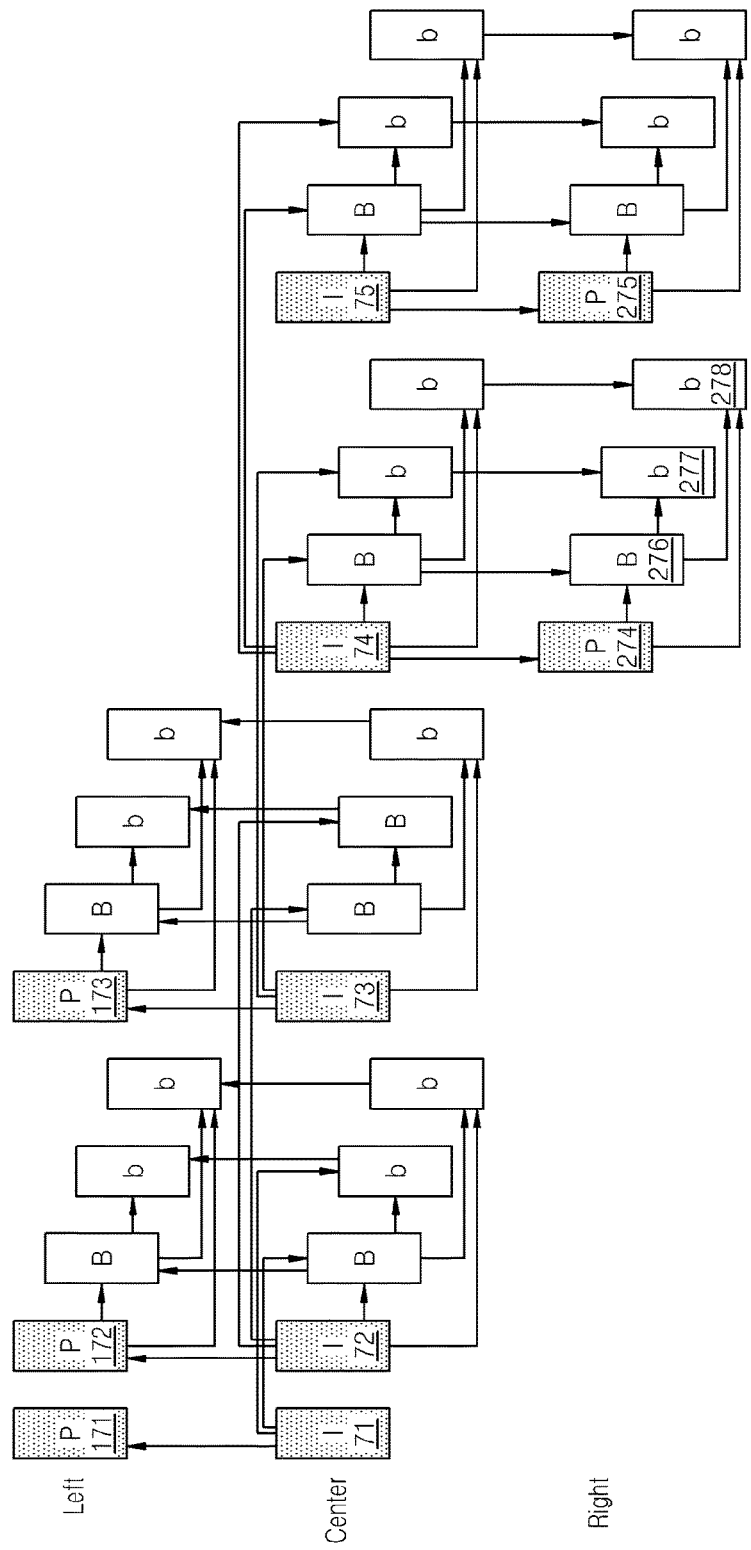
FIGS. 7B and 7C illustrate an encoding order of the multiview video prediction structure of FIG. 7A, and an encoding order during viewpoint switching.
Figure 7C:
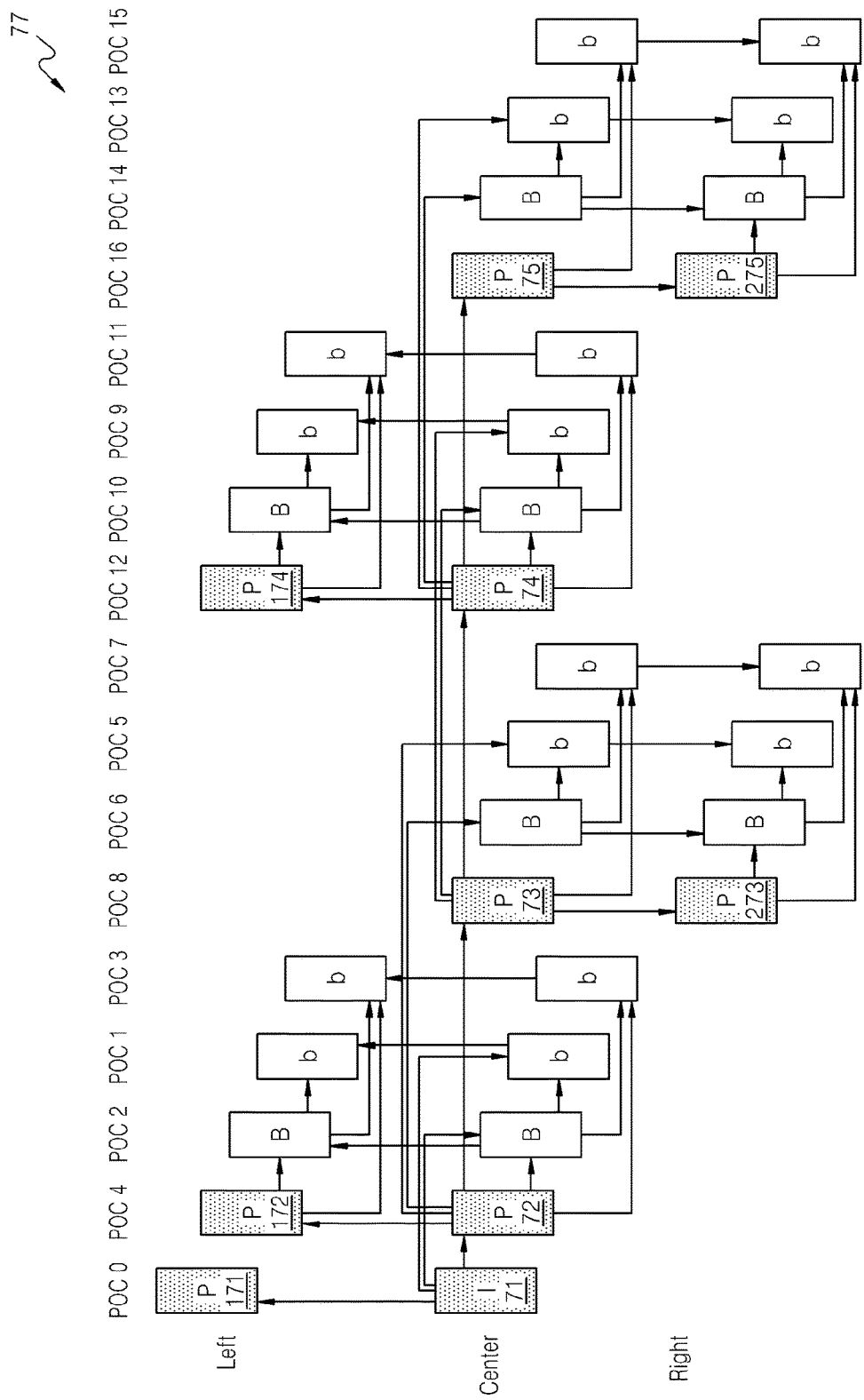

FIG. 7A illustrates a reproduction order 70 of a multiview video prediction structure according to an exemplary embodiment. FIGS. 7B and 7C illustrate an encoding order 76 of the multiview video prediction structure of FIG. 7A, and an encoding order 77 during viewpoint switching.

According to the multiview video prediction structure of FIG. 7A, only inter-prediction is performed on base view images according to a prediction structure, as described above with reference to FIG. 5A, wherein a CRA image is used as an anchor picture. In other words, anchor pictures 71 through 75 (71, 73, 74 and 75) that are I-picture type images do not reference other images, but other images that are B- and b-picture type images are predicted by referring to other base view images. B-picture type images are predicted by referring to an I-picture type anchor picture that precedes the B-picture type images according to a POC order, and an I-picture type anchor picture that follows the images of a B-picture type according to the POC order. b-picture type images are predicted by referring to an I-picture type anchor picture that precedes the b-picture type images according to a POC order and a B-picture type image that follows the b-picture type images according to the POC order, or by referring to a B-picture type image that precedes the b-picture type images according to the POC order and an I-picture type anchor picture that follows the b-picture type images according to the POC order.

However, the multiview video prediction structure of FIG. 7A is significant in a prediction structure of additional view images. As described above with reference to FIGS. 1A, 1B, 2A, and 2B, in the multiview video prediction structure according to an exemplary embodiment, at least one viewpoint switching section and at least one view decoding refresh image exist in additional view images.

Based on left view images and right view images in the reproduction order 70 of the multiview video prediction structure, according to an exemplary embodiment, a first viewpoint switching section includes images from POC 1 to POC 4, a second viewpoint switching section includes images from POC 5 to POC 8, a third viewpoint switching section includes images from POC 9 to POC 12, and a fourth viewpoint switching section includes images from POC 13 to POC 16.

Whenever a viewpoint switching section is changed, a reproduction viewpoint may be changed from a current additional viewpoint to another additional viewpoint, and thus, once a reproduction viewpoint of an additional viewpoint is changed, a following viewpoint switching section is processed only after reproduction of all pictures included in a current viewpoint switching section, starting from a view decoding refresh image, is completed.

According to the multiview video prediction structure of FIG. 7A, a left view viewpoint switching image 172 and a right view viewpoint switching image 752 are located in the first viewpoint switching section, a left view viewpoint switching image 173 and a right view viewpoint switching section 273 are located in the second viewpoint switching section, a left view viewpoint switching section 174 and a right view viewpoint switching section 274 are located in the third viewpoint switching section, and a left view viewpoint switching image 175 and a right view viewpoint switching image 275 are located in the fourth viewpoint switching section.

Inter-view prediction that references base view images and inter-prediction that references images of the same view are performed on left and right view images. However, according to the multiview video prediction structure of FIG. 7A, inter-prediction that references images in different viewpoint switching sections is not performed. In other words, images in the second viewpoint switching section may not reference images in the first viewpoint switching section even when the images in the first viewpoint switching section are first reproduced. In other words, despite the images in the first viewpoint switching section being restored before the images in the second viewpoint switching section, inter-prediction performed on the images in the second viewpoint switching section does not reference the images in the first viewpoint switching section.

In the inter-prediction of images in the current viewpoint switching section, not only may images included in a viewpoint switching section located immediately before a current viewpoint switching section of a current image according to a reproduction order be excluded, but images that are included in the same viewpoint as the current viewpoint and in at least one viewpoint switching section preceding the current viewpoint switching section may also be excluded.

Restored images stored in an RPB before prediction of a current view decoding refresh image are images of the same viewpoint, which are restored in a viewpoint switching section preceding a current viewpoint switching section. Thus, the multiview video encoding apparatus 10 according to an exemplary embodiment may delete the restored images stored in the RPB before predicting the current view decoding refresh image. Since the restored images are no longer stored in the RPB, the multiview video encoding apparatus 10 not only does not reference a view decoding refresh image of the same viewpoint in the preceding viewpoint switching section, but also does not reference other restored images in order to encode the current view decoding refresh image. However, the multiview video encoding apparatus 10 may perform inter-view prediction by referring to a base view image to which the same POC as the POC is assigned so as to encode the current view decoding refresh image.

The multiview video encoding apparatus 10 may reference images that are of the same viewpoint, pre-restored, and included in the current viewpoint switching section so as to encode other images included in the current viewpoint switching section, after encoding the current view decoding refresh image of the current viewpoint switching section. However, since the restored images of the same viewpoint in the preceding viewpoint switching section are no longer stored in the RPB, the restored images of the same viewpoint in the preceding viewpoint switching section are no longer referred to even while encoding the image other than the current view decoding refresh image included in the current viewpoint switching section.

The restoration process used for the additional view images restoration process may be the same as the restoration process used for multiview video restoration processes according to the multiview video prediction structure of FIG. 7A.

The multiview video decoding apparatus 20 may only perform motion compensation that directly or indirectly references an anchor picture, on base view images, so as to restore the base view images.

However, the multiview video decoding apparatus 20 may only perform disparity compensation that references the base view images and motion compensation that references images of the same viewpoint so as to restore left view images and right view images.

Here, according to the multiview video prediction structure of FIG. 7A, motion compensation that references images in different viewpoint switching sections is not performed. Images of the same viewpoint and located in at least one viewpoint switching section preceding a current viewpoint switching section may be excluded as reference images for inter-prediction of images included in the current viewpoint switching section.

The multiview video decoding apparatus 20 may delete restored images stored in an RPB before prediction-restoring a view decoding refresh image. Since restored images of the same viewpoint are no longer stored in the RPB, the multiview video decoding apparatus 20 not only does not reference a view decoding refresh image of the same viewpoint in the preceding viewpoint switching section, but also does not reference other restored images so as to restore a current view decoding refresh image. However, the multi-view video encoding apparatus 10 may restore the current view decoding refresh image by performing disparity compensation by referring to a base view image to which the same POC as the current view decoding refresh image is assigned.

The multiview video decoding apparatus 20 may reference images of the same viewpoint, pre-restored, and included in the current viewpoint switching section, so as to restore other images included in the current viewpoint switching section after restoring the current view decoding refresh image included in the current viewpoint switching section. However, since the restored images of the same viewpoint in the preceding viewpoint switching section are no longer stored in the RPB, the restored images of the same viewpoint in the preceding viewpoint switching section may no longer be referred to while restoring images other than the current view decoding refresh image included in the current viewpoint switching section.

The multiview video prediction structure of FIG. 7A is useful when viewpoint switching is performed in a restoration viewpoint or reproduction viewpoint of an additional viewpoint as in FIGS. 7B and 7C.

The encoding order 76 of FIG. 7B is an encoding order from the left view images to the right view images when viewpoint switching occurs in front of the third viewpoint switching section including a view decoding refresh image of POC 12 while the left view images are being restored in the multiview video prediction structure of FIG. 7A.

It is assumed that viewpoint switching is performed such that the left view images are restored up to the first and second viewpoint switching sections, and then the right view images are restored from the third viewpoint switching section. Since the left view images are restored up to the second viewpoint switching section and the right view images are restored from the third viewpoint switching section, the right view images of the second viewpoint switching section are not restored. However, since the right view images in the second viewpoint switching section are not referred to while predicting right view images 276, 277, and 278 in the third viewpoint switching section, the right view images 276, 277, and 278 may be restored via motion compensation that references right view images 274 and 275 that are pre-restored in the third viewpoint switching section, even if the right view images in the second viewpoint switching section are not restored.

Accordingly, the multiview video decoding apparatus 20 according to the multiview video prediction structure of FIGS. 7A and 7B does not perform motion compensation that references images of the same viewpoint included in a viewpoint switching section preceding a current GOP in order to restore additional view images. Thus, new additional view images may be restored without a decoding error or an image loss, even when viewpoint switching occurs, if a reproduction viewpoint is changed in a view decoding refresh image nearest to a point where the viewpoint switching occurred.

The multiview video prediction structure of FIGS. 7A and 7B is useful when viewpoint switching frequently occurs. The encoding order 77 of FIG. 7C is an encoding order of additional view images when a reproduction viewpoint changes per viewpoint switching section in the multiview video prediction structure of FIG. 7A.

In other words, the right view images in the second viewpoint switching section are decoded when the left view images in the first viewpoint switching section are restored and reproduced and viewpoint switching occurs in a view decoding refresh image 172. Also, the left view images in the third viewpoint switching section are decoded again when the right view images in the second viewpoint switching section are restored and reproduced and viewpoint switching occurs in a view decoding refresh image 273. Also, the right view images in the fourth viewpoint switching section are decoded again when the left view images in the third viewpoint switching section are restored and reproduced and viewpoint switching occurs in a view decoding refresh image 174.

Accordingly, even when viewpoint switching occurs from a first additional viewpoint to a second additional viewpoint in a current viewpoint switching section, second additional view images in a next viewpoint switching section after the current viewpoint switching section do not need to reference restored images included in the current viewpoint switching section, and thus, the second additional view images in the next viewpoint switching section may be restored by using restored images and base view restored images in the next viewpoint switching section. Accordingly, by using a viewpoint switching section and a view decoding refresh image, according to an exemplary embodiment, images of a new additional viewpoint may be restored without a decoding error or image loss despite frequent viewpoint switching.

Also, since a base view anchor picture in base view images is a randomly accessed image, such as a CRA image, a restoration quality of images generated according to inter-view prediction or disparity compensation that references the base view images may be high. Accordingly, even when inter-prediction or motion compensation is not performed on a view decoding refresh image, restoration quality may be guaranteed through inter-view prediction or disparity compensation that references the base view images.

Accordingly, the multiview video encoding apparatus 10 and the multiview video decoding apparatus 20, which use the multiview video prediction structure using the viewpoint switching section and the view decoding refresh image, according to exemplary embodiments, may improve encoding efficiency by not using a randomly accessed image in an additional view image, while securing stability of restoration quality through inter-view prediction or disparity compensation that references base view images.

A method of prediction-encoding and restoring additional images according to a prediction structure that does not reference images of the same viewpoint as the additional viewpoint and are restored immediately before a current image, in order to perform inter-prediction on the additional view images, has been described above regarding the multiview video encoding apparatus 10 and the multiview video decoding apparatus 20 with reference to FIGS. 1A through 7B. Accordingly, even when a viewpoint is changed to a second additional viewpoint while restoring first additional view images, images of the same viewpoint as the additional viewpoint which have been restored immediately before a current image are not referred to, and thus, second additional view images may be restored without a decoding error or an image loss.

The multiview video encoding apparatus 10 that performs the multiview video encoding method of FIG. 1B may generate samples by performing intra prediction, inter prediction (inter-prediction and inter-view prediction), transformation, and quantization according to image blocks, and output a bitstream by performing entropy-encoding on the samples. In order to output a video encoding result, e.g., a base view image stream and an additional view image stream, the multiview video encoding apparatus 10 may operate in cooperation with an internal video encoding processor installed therein or an external video encoding processor so as to perform video encoding operations including transformation and quantization. The internal video encoding processor may be a separate processor, or alternatively, the multiview video encoding apparatus 10, a central processing apparatus, or a graphic processing apparatus may include a video encoding processing module to perform the video encoding operations.

Figure 3B:
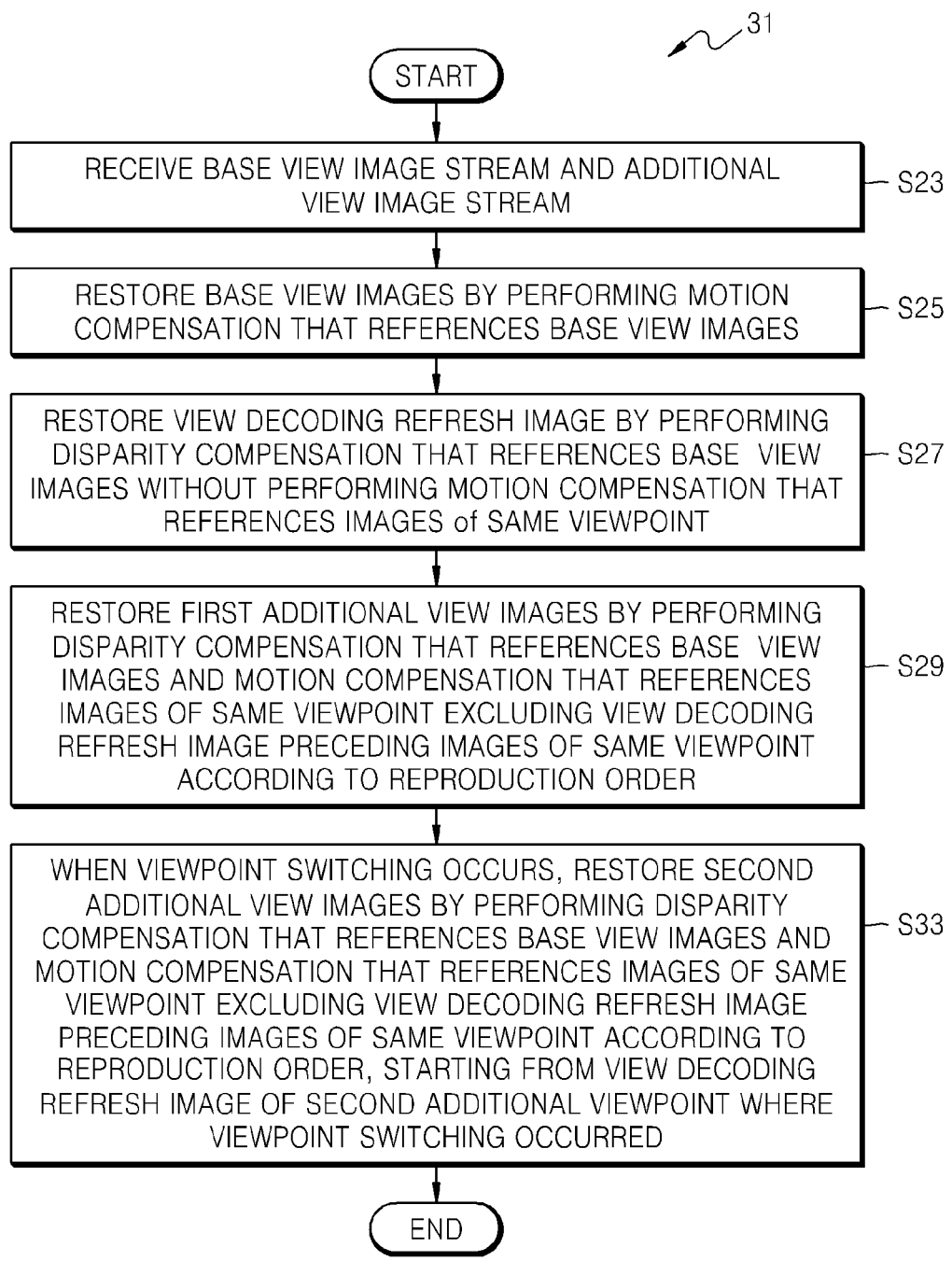
FIG. 3B is a flowchart of a multiview video decoding method of the multiview video decoding apparatus of FIG. 3A.

The multiview video decoding apparatus 20 that performs the multiview video decoding methods 21 and 31 of FIGS. 2B and 3B decodes a received base view image stream and a received additional view image stream. In other words, inverse quantization, inverse transformation, intra prediction, and motion compensation (inter-motion compensation and inter-view disparity compensation) are performed according to image blocks with respect to the base view image stream and the additional view image stream to restore samples of base view images from the base view image stream and samples of additional view images from the additional view image stream. In order to output a restored image generated as a decoding result, the multiview video decoding apparatus 20 may operate in cooperation with an internal video decoding processor installed therein or an external video decoding processor so as to perform video restoration operations including inverse quantization, inverse transformation, and prediction/compensation. The internal video decoding processor may be a separate processor, or alternatively, the multiview video decoding apparatus 20, a central processing apparatus, or a graphic processing apparatus may include a video decoding processing module to perform the video restoration operations.

As described above, the multiview video encoding apparatus 10 and the multiview video decoding apparatus 20 may spilt blocks of video data into coding units having a tree structure, and coding units, prediction units, and transformation units may be used for inter-view prediction or inter-prediction of coding units. Hereinafter, a video encoding method, a video encoding apparatus, a video decoding method, and a video decoding apparatus based on coding units having a tree structure and transformation units will be described with reference to FIGS. 8 through 20.

In principle, during encoding and decoding processes for a multiview video, encoding and decoding processes for base view images and encoding and decoding processes for additional view images are separately performed. In other words, when inter-view prediction is performed on a multiview video, encoding results and decoding results of single-view videos may be mutually referred to, but separate encoding and decoding processes may be performed according to single-view videos.

Accordingly, since video encoding and decoding processes based on coding units having a tree structure as described below with reference to FIGS. 8 through 20 are video encoding and decoding processes for processing a single-view video, only inter-prediction and motion compensation are performed. However, as described above with reference to FIGS. 1A through 7B, in order to encode and decode a multiview video, inter-view prediction and inter-view disparity compensation are performed on base view images and additional view images.

Figure 8:
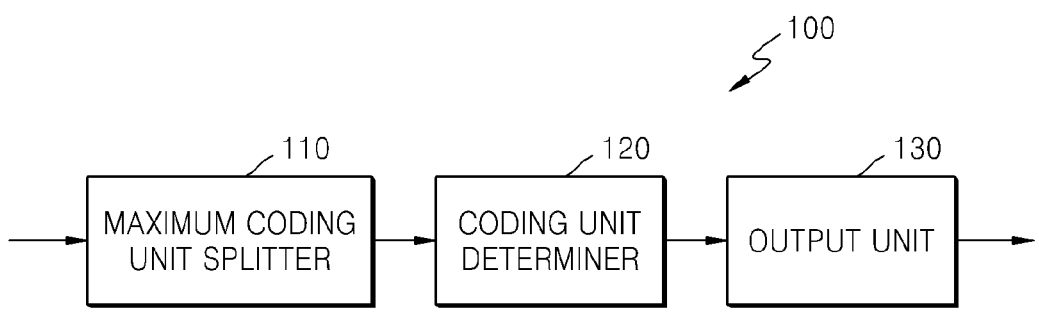
FIG. 8 is a block diagram of a video encoding apparatus based on coding units according to a tree structure, according to an exemplary embodiment.

Accordingly, in order for the multiview video encoding apparatus 10 to encode a multiview video based on coding units having a tree structure, the multiview video encoding apparatus 10 may include as many video encoding apparatuses 100 of FIG. 8 as the number of viewpoints so as to perform video encoding according to each single-view video, thereby controlling each video encoding apparatus 100 to encode an assigned single-view video. Also, the multiview video encoding apparatus 10 may perform inter-view prediction by using an encoding result of individual single viewpoints of each video encoding apparatus 100. Accordingly, the multiview video encoding apparatus 10 may generate a base view image stream and an additional view image stream, which include encoding results according to viewpoints, according to viewpoints.

Figure 9:
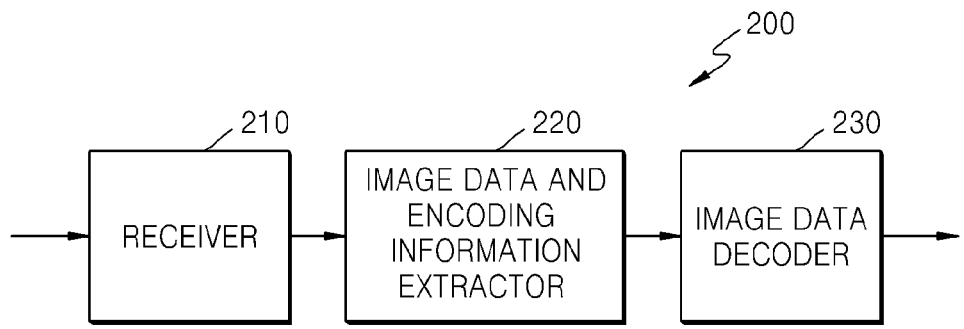
FIG. 9 is a block diagram of a video decoding apparatus based on coding units according to a tree structure, according to an exemplary embodiment.

Similarly, in order for the multiview video decoding apparatus 20 to decode a multiview video based on coding units having a tree structure, the multiview video decoding apparatus 10 may include as many video decoding apparatuses 200 of FIG. 9 as the number of viewpoints of the multiview video so as to perform video decoding according to viewpoints with respect to a received base view image stream and a received additional view image stream, thereby controlling each video decoding apparatus 200 to decode an assigned single-view video. Also, the multiview video decoding apparatus 20 may perform inter-view disparity compensation by using a decoding result of individual single viewpoints of each video decoding apparatus 200. Accordingly, the multiview video decoding apparatus 20 may generate base view images and additional view images, which are restored according to viewpoints.

FIG. 8 is a block diagram of a video encoding apparatus 100 based on coding units according to a tree structure, according to an exemplary embodiment.

The video encoding apparatus 100 involving video prediction based on coding units according to a tree structure includes a maximum coding unit splitter 110, a coding unit determiner 120, and an output unit 130.

The maximum coding unit splitter 110 may split a current picture based on a maximum coding unit that is a coding unit having a maximum size for a current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and length in squares of 2. The image data may be output to the coding unit determiner 120 according to the at least one maximum coding unit.

A coding unit according to an exemplary embodiment may be characterized by a maximum size and a depth. The depth denotes the number of times the coding unit is spatially split from the maximum coding unit, and as the depth deepens, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 120 encodes at least one split region obtained by splitting a region of the maximum coding unit according to depths, and determines a depth to output finally encoded image data according to the at least one split region. In other words, the coding unit determiner 120 determines a coded depth by encoding the image data in the deeper coding units according to depths, according to the maximum coding unit of the current picture, and selecting a depth having the least encoding error. The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to the same depth in one maximum coding unit, it is determined whether to split each of the coding units corresponding to the same depth to a lower depth by measuring an encoding error of the image data of each coding unit, separately. Accordingly, even when image data is included in one maximum coding unit, the encoding errors may differ according to regions in the one maximum coding unit, and thus, the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splitting times from a maximum coding unit to a minimum coding unit. A first maximum depth according to an exemplary embodiment may denote the total number of splitting times from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3, and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit.

Since the number of deeper coding units increases whenever the maximum coding unit is split according to depths, encoding, including the prediction encoding and the transformation, is performed on all of the deeper coding units generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, e.g., based on a coding unit that is no longer split to coding units corresponding to a lower depth. Hereinafter, the coding unit that is no longer split and becomes a basis unit for prediction encoding may also be referred to as a 'prediction unit'. A partition obtained by splitting the prediction unit may include a prediction unit or a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, an inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the data unit for the transformation may include a data unit for an intra mode and a data unit for an inter mode.

The transformation unit in the coding unit may be recursively split into smaller sized regions in a manner similar to that in which the coding unit is split according to the tree structure. Thus, residual data in the coding unit may be divided according to the transformation unit having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Encoding information according to coding units corresponding to a coded depth requires not only information about the coded depth, but also information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in a maximum coding unit and methods of determining a prediction unit or partition, and a transformation unit, according to exemplary embodiments, will be described in detail later with reference to FIGS. 10 through 20.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depths may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus, the split information may be defined not to split the current coding unit to a lower depth. Alternatively, if the current depth of the current coding unit is not the coded depth, the encoding is performed on the coding unit of the lower depth, and thus, the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus, the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a square data unit obtained by splitting the minimum coding unit constituting the lowermost depth by 4. Alternatively, the minimum unit according to an exemplary embodiment may be a maximum square data unit that may be included in all of the coding units, prediction units, partition units, and transformation units included in the maximum coding unit.

For example, the encoding information output by the output unit 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit, may also be output through a header of a bitstream, a sequence parameter set, or a picture parameter set. The output unit 130 may encode and output reference information related to prediction, prediction information, and slice type information.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit with the current depth having a size of 2N×2N may include a maximum of 4 of the coding units with the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus, it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

The multiview video encoding apparatus 10 described above with reference to FIG. 1A may include as many video encoding apparatuses 100 as the number of viewpoints, in order to encode single-view images according to viewpoints of a multiview video. For example, the base viewpoint encoder 12 may include one video encoding apparatus 100 and the additional viewpoint encoder 14 may include as many video encoding apparatuses 100 as the number of viewpoints.

When the video encoding apparatus 100 encodes base view images, the coding unit determiner 120 may determine, for each maximum coding unit, a prediction unit for inter-prediction according to coding units having a tree structure, and perform inter-prediction according to prediction units.

Even when the video encoding apparatus 100 encodes additional view images, the coding unit determiner 120 may determine, for each maximum coding unit, coding units and prediction units having a tree structure, and perform inter-prediction according to prediction units.

In detail, in order to perform inter-prediction for predicting the additional view images, the video encoding apparatus 100 for the additional view images may reference additional view images of the same viewpoint as the additional viewpoint and excluding images included in a viewpoint switching section preceding the additional view images of the same viewpoint according to a reproduction order.

The video encoding apparatus 100 for the additional view images may reference only restored images included in a current viewpoint switching section of a current image excluding a view decoding refresh image included in a viewpoint switching section preceding the current viewpoint switching section according to a reproduction order.

The video encoding apparatus 100 for the additional view images may flush an RPB storing restored images of the same viewpoints of previous viewpoint switching sections whenever a view decoding refresh image is predicted. Accordingly, images included in the current viewpoint switching section may be predicted by only referring to restored images included in the current viewpoint switching section and base view restored images.

FIG. 9 is a block diagram of a video decoding apparatus 200 based on coding units having a tree structure, according to an exemplary embodiment.

The video decoding apparatus 200 that involves video prediction based on coding units having a tree structure includes a receiver 210, an image data and encoding information extractor 220, and an image data decoder 230.

Definitions of various terms, such as a coding unit, a depth, a prediction unit, a transformation unit, and information about various encoding modes, for decoding operations of the video decoding apparatus 200 may be identical to those described with reference to FIG. 8 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture from a header of the current picture, a sequence parameter set, or a picture parameter set.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. If information about a coded depth and encoding mode of a corresponding maximum coding unit is recorded according to predetermined data units, the predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation.

The image data decoder 230 may perform intra prediction or motion compensation according to a partition and a prediction mode of each coding unit, based on the information about the partition type and the prediction mode of the prediction unit of the coding unit according to coded depths.

In addition, the image data decoder 230 may read information about a transformation unit according to a tree structure for each coding unit so as to perform inverse transformation based on transformation units for each coding unit, for inverse transformation for each maximum coding unit. Via the inverse transformation, a pixel value of a spatial region of the coding unit may be restored.

The image data decoder 230 may determine a coded depth of a current maximum coding unit by using split information according to depths. If the split information indicates that image data is no longer split in the current depth, the current depth is a coded depth. Accordingly, the image data decoder 230 may decode encoded data in the current maximum coding unit by using the information about the partition type of the prediction unit, the prediction mode, and the size of the transformation unit for each coding unit corresponding to the coded depth.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

The multiview video encoding apparatus 10 described above with reference to FIG. 1A may include as many image data decoders 230 as the number of viewpoints, so as to generate a reference image for inter-prediction according to viewpoints of a multiview video. For example, the base viewpoint encoder 12 may include one image data decoder 230, and the additional viewpoint encoder 14 may include as many of the image data decoders 230 as the number of additional viewpoints.

Also, the multiview video decoding apparatus 20 described above with reference to FIGS. 2A and 3A may include a number of the video decoding apparatuses 200 corresponding to the number of viewpoints, so as to restore base view images and additional view images by decoding a received base view image stream and a received additional view image stream. For example, the base view image restorer 22 may include one video decoding apparatus 200 and the additional view image restorer 24 may include the number of video decoding apparatuses 200 corresponding to the number of additional viewpoints.

When the base view image stream is received, the image data decoder 230 of the video decoding apparatus 200 may split samples of base view images extracted from the base view image stream by the image data and encoding information extractor 220 into coding units having a tree structure. The image data decoder 230 may restore the base view images by performing motion compensation according to prediction units for inter-prediction, on the coding units having the tree structure obtained by splitting the samples of the base view images.

When the additional view image stream is received, the image data decoder 230 of the video decoding apparatus 200 may split samples of additional view images extracted from the additional view image stream by the image data and encoding information extractor 220 into coding units having a tree structure. The image data decoder 230 may restore the additional view images by performing motion compensation according to prediction units for inter-prediction, on the coding units obtained by splitting the samples of the additional view images.

In detail, the image data decoder 230 for first additional view images may restore the first additional view images by performing at least one of disparity compensation that references the restored base view images and motion compensation that references the first additional view images.

In order to perform motion compensation on the first additional view images, the image data decoder 230 may reference additional view images of the same viewpoint, excluding images included in a viewpoint switching section preceding the additional view images of the same viewpoint according to a reproduction order.

The image data decoder 230 for the first additional view images may only reference restored images included in a current viewpoint switching section of a current image, excluding a view decoding refresh image included in a viewpoint switching section preceding the current viewpoint switching section according to a reproduction order.

The image data decoder 230 for the first additional view images may flush (e.g., delete) an RPB storing restored images of the same viewpoint as that of the first additional view images of a previous viewpoint switching section whenever motion compensation is performed on a view decoding refresh image. Accordingly, the images included in the current viewpoint switching section may perform motion compensation by only referring to restored images included in the current viewpoint switching section and base view restored images.

When viewpoint switching occurs while restoring and reproducing the first additional view images, the image data decoder 230 may restore second additional view images from a next viewpoint switching section by using a second additional view image stream.

Also, in a new viewpoint switching section, the image data decoder 230 may restore the second additional view images by performing at least one of disparity compensation that references the restored base view images and motion compensation that references the second additional view images.

The image data decoder 230 may delete an RPB storing restored images of the same viewpoint, which are pre-restored, before performing motion compensation on a view decoding refresh image of a second additional viewpoint. However, the image data decoder 230 may perform motion compensation on the second additional view images by referring to restored images included in the current viewpoint switching section and the base view restored images, excluding restored images included in a viewpoint switching section preceding the second additional view images according to a reproduction order. Accordingly, even when viewpoint switching occurs while restoring the additional view images, the additional view images may be restored by changing a viewpoint without a decoding error or an image loss.

Accordingly, even when viewpoint switching frequently occurs in a viewpoint switching section including additional view images, and view decoding refresh images, a decoding error may not be generated and a restored image may not be damaged while restoring a new additional viewpoint after the viewpoint switching.

Thus, the video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

Figure 10:
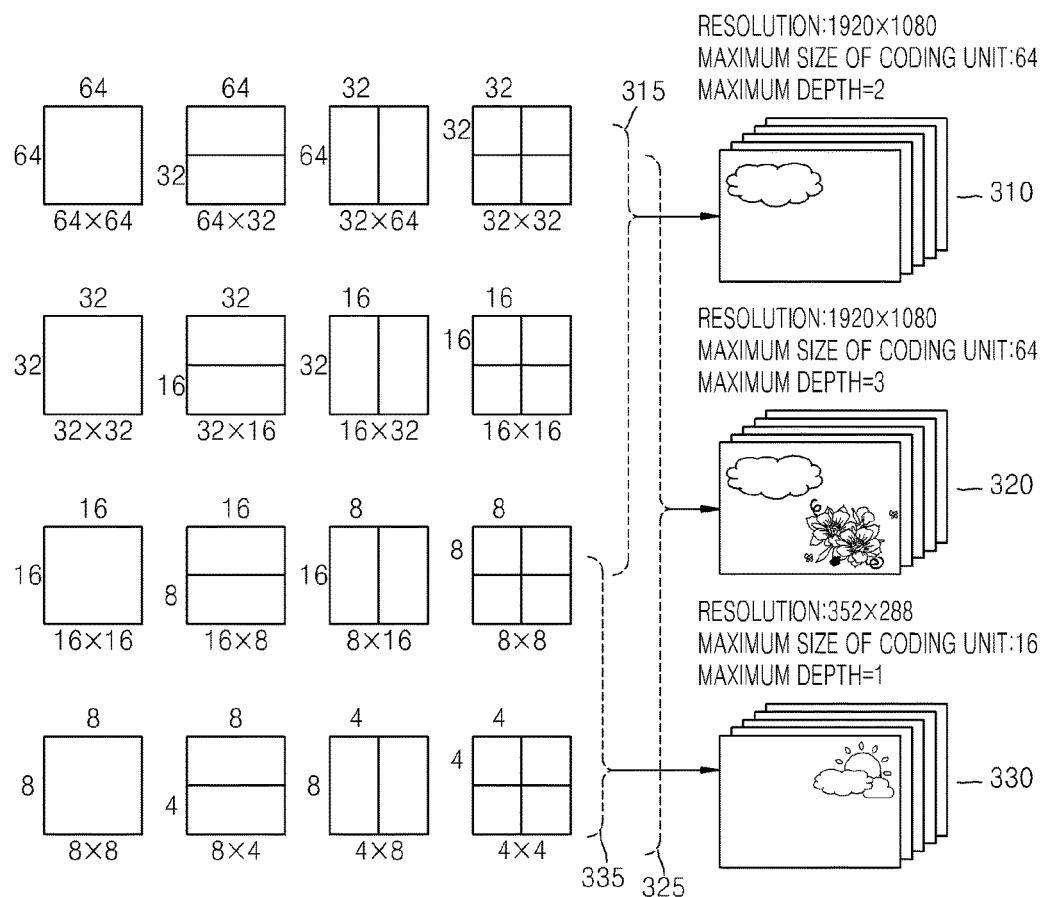
FIG. 10 is a diagram for describing a concept of coding units according to an exemplary embodiment.

FIG. 10 is a diagram for describing a concept of coding units according to an exemplary embodiment.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 10 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the video data 310 may include a maximum coding unit having a long axis size of 64, and coding units having long axis sizes of 32 and 16, since depths are deepened to two layers by splitting the maximum coding unit twice. Since the maximum depth of the video data 330 is 1, coding units 335 of the video data 330 may include a maximum coding unit having a long axis size of 16, and coding units having a long axis size of 8, since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8, since the depths are deepened to 3 layers by splitting the maximum coding unit three times. As a depth deepens, detailed information may be precisely expressed.

Figure 11:
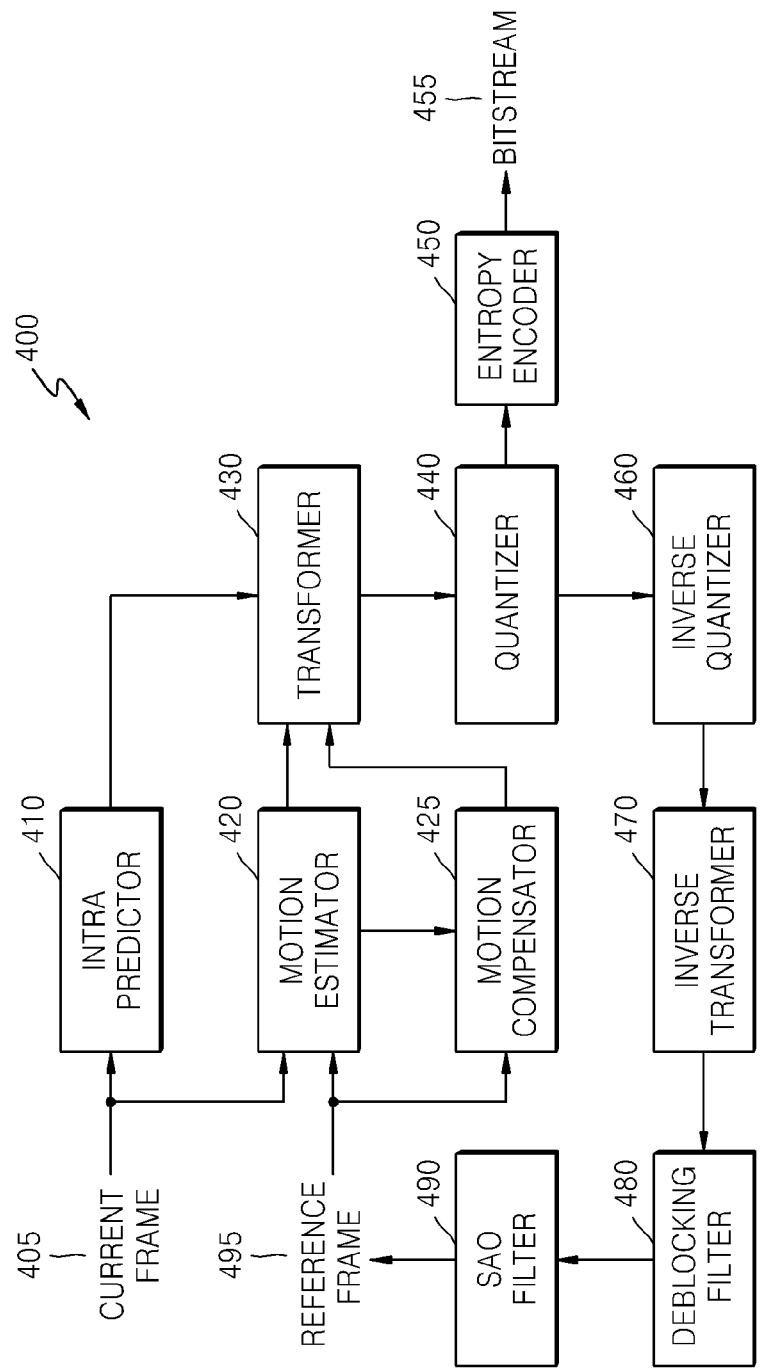
FIG. 11 is a block diagram of an image encoder based on coding units, according to an exemplary embodiment.

FIG. 11 is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 respectively perform inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking filter 480 and a sample adaptive offset (SAO) filter 490. The quantized transformation coefficient may be output as a bitstream 455 through an entropy encoder 450.

In order for the image encoder 400 to be implemented in the video encoding apparatus 100, all elements of the image encoder 400, e.g., the intra predictor 410, the motion estimator 420, the motion compensator 425, the transformer 430, the quantizer 440, the entropy encoder 450, the inverse quantizer 460, the inverse transformer 470, the deblocking filter 480, and the SAO filter 490 may perform operations based on each coding unit among coding units having a tree structure while considering the maximum depth of each maximum coding unit.

Specifically, the intra predictor 410, the motion estimator 420, and the motion compensator 425 may determine partitions and a prediction mode of each coding unit from among the coding units having a tree structure while considering the maximum size and the maximum depth of a current maximum coding unit, and the transformer 430 may determine the size of the transformation unit in each coding unit from among the coding units having a tree structure.

When the image encoder 400 encodes additional view images in a multiview video encoding structure, the motion estimator 420 may determine, for each maximum coding unit, prediction units for inter-prediction according to coding units having a tree structure, and may predict an anchor picture of an additional viewpoint by referring to other anchor pictures of the same viewpoint as that of the anchor picture while performing inter-prediction according to the prediction units.

Specifically, the motion estimator 420 may perform motion prediction by performing inter-prediction according to prediction units. A restored image of the same additional view image may be used as a reference image for inter-prediction of an additional view image. However, for inter-prediction of current additional view images, restored images included in a current viewpoint switching section may be referred to, excluding restored images in a previous viewpoint switching section preceding the current viewpoint switching section according to a reproduction order. Whenever prediction is performed on a view decoding refresh image included in a viewpoint switching section, previous restored images stored in an RPB storing reference images of the same viewpoint may be removed.

Also, the motion compensator 425 may restore additional view images by performing motion compensation according to prediction units for inter-prediction. In order to perform motion compensation on current additional view images, restored images included in a current viewpoint switching section may be referred to, excluding restored images in a previous viewpoint switching section preceding the current viewpoint switching section according to a reproduction order. Whenever motion compensation is performed on a view decoding refresh image included in a viewpoint switching section, previous restored images stored in an RPB storing reference images of the same viewpoint may be removed.

Figure 12:
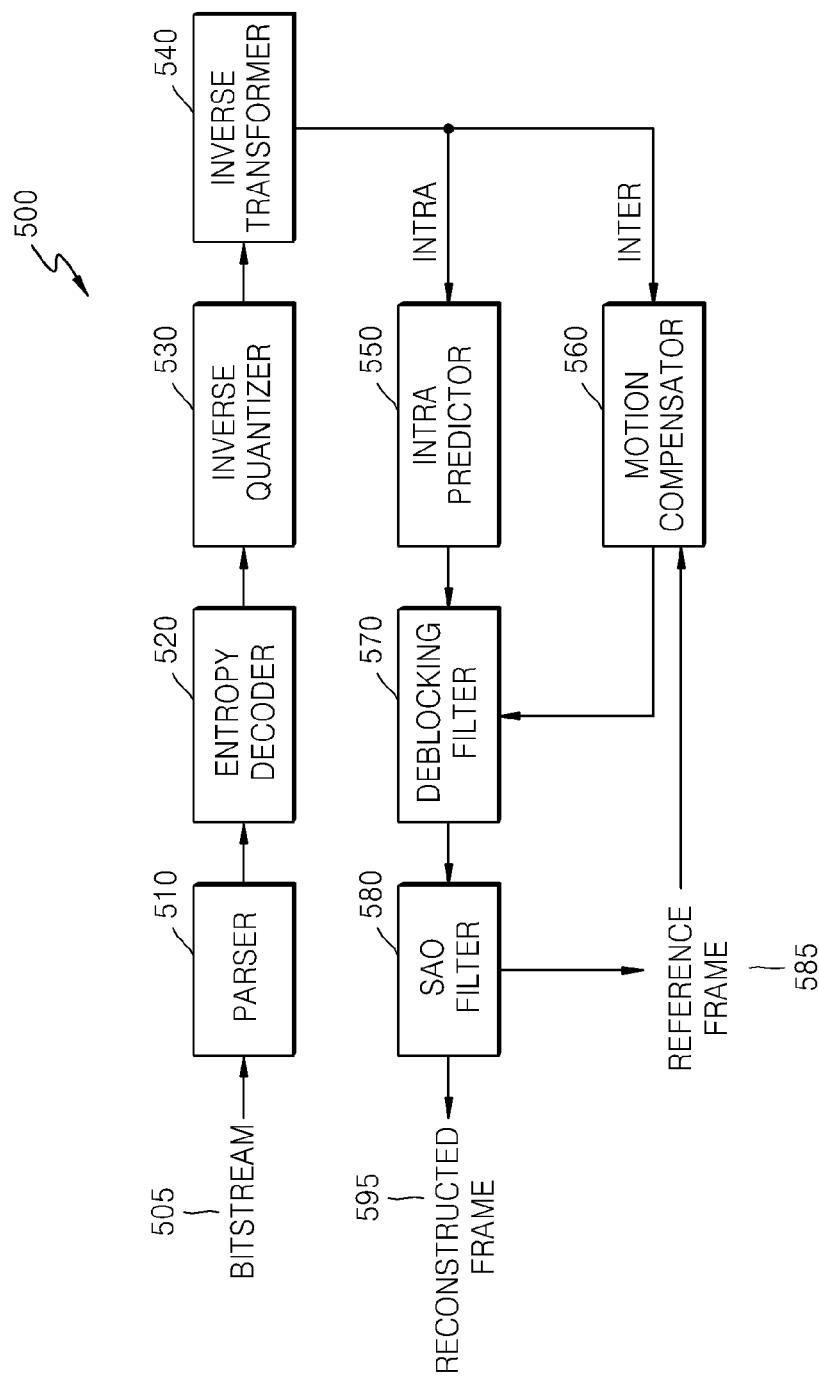
FIG. 12 is a block diagram of an image decoder based on coding units, according to an exemplary embodiment.

FIG. 12 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored (e.g., reconstructed) frame 595 after being post-processed through a deblocking filter 570 and an SAO filter 580. Also, the image data that is post-processed through the deblocking filter 570 and the SAO filter 580 may be output as the reference frame 585.

In order to decode the image data in the image data decoder 230 of the video decoding apparatus 200, the image decoder 500 may perform operations that are performed after the parser 510.

In order for the image decoder 500 to be implemented in the video decoding apparatus 200, all elements of the image decoder 500, e.g., the parser 510, the entropy decoder 520, the inverse quantizer 530, the inverse transformer 540, the intra predictor 550, the motion compensator 560, the deblocking filter 570, and the SAO filter 580 may perform operations based on coding units having a tree structure for each maximum coding unit.

Specifically, the intra predictor 550 and the motion compensator 560 may perform operations based on partitions and a prediction mode for each of the coding units having a tree structure, and the inverse transformer 540 may perform operations based on a size of a transformation unit for each coding unit.

Specifically, when the image decoder 500 decodes an additional view image stream in a multiview video encoding structure, the motion compensator 560 may restore additional view images by performing motion compensation according to prediction units. In order to perform motion compensation on current additional view images, restored images included in a current viewpoint switching section may be referred to, excluding restored images in a previous viewpoint switching section preceding the current viewpoint switching section according to a reproduction order. Previously restored images stored in an RPB storing reference images of the same viewpoint may be removed whenever motion compensation is performed on a view decoding refresh image included in a viewpoint switching section.

Figure 13:
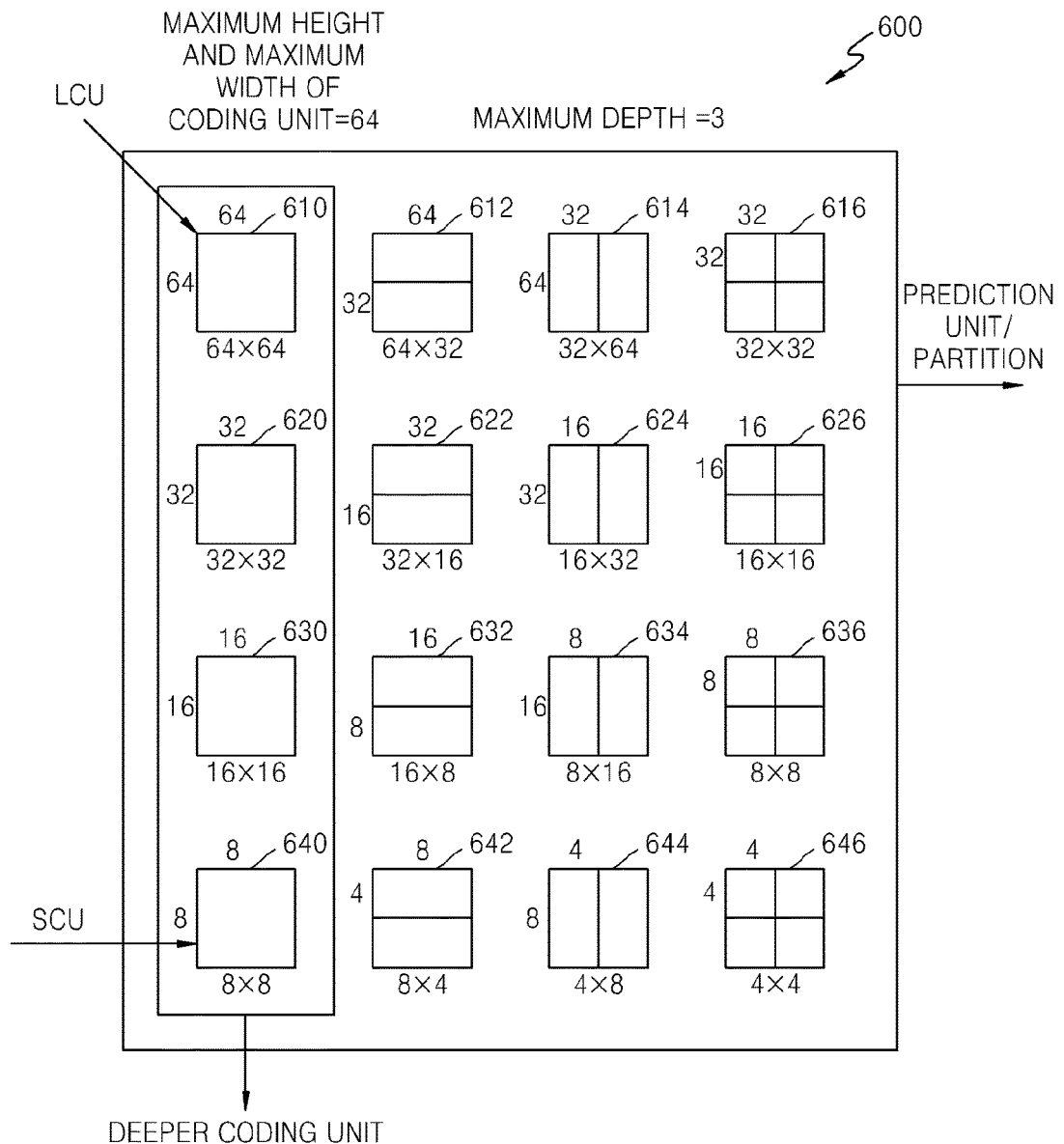
FIG. 13 is a diagram illustrating deeper coding units according to depths, and partitions, according to an exemplary embodiment.

FIG. 13 is a diagram illustrating deeper coding units according to depths, and partitions, according to an exemplary embodiment.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. In this case, the maximum depth refers to a total number of times the coding unit is split from the maximum coding unit to the minimum coding unit. Since a depth deepens along a vertical axis of the hierarchical structure 600, a height and a width of the deeper coding units are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, e.g., a height by width, is 64×64. The depth deepens along the vertical axis, resulting in a coding unit 620 having a size of 32×32 and a depth of 1, a coding unit 630 having a size of 16×16 and a depth of 2, a coding unit 640 having a size of 8×8 and a depth of 3, and a coding unit 646 having a size of 4×4 and a depth of 4. The coding unit 646 having a size of 4×4 and a depth of 4 may be a minimum coding unit.

The prediction unit and the partitions of a coding unit are arranged along the horizontal axis according to each depth. In other words, if the coding unit 610 having a size of 64×64 and a depth of 0 is a prediction unit, the prediction unit may be split into partitions included in the encoding unit 610, e.g., a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, e.g., a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, e.g., a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, e.g., a partition having a size of 8×8 included in the coding unit 640, partitions 642 having a size of 8×4, partitions 644 having a size of 4×8, and partitions 646 having a size of 4×4.

Lastly, the coding unit 650 having the size of 4×4 and the depth of 4 is a minimum coding unit having a lowest depth. Thus, a prediction unit of the coding unit 650 may be set in a partition having a size of 4×4.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

Figure 14:
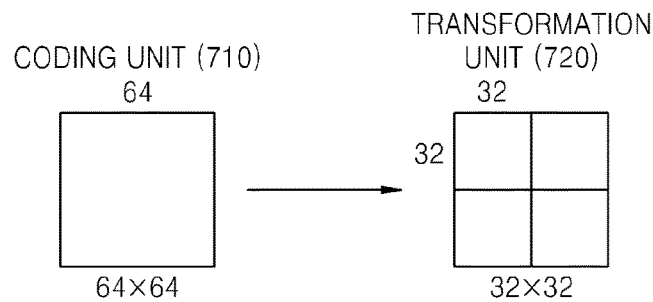
FIG. 14 is a diagram for describing a relationship between a coding unit and transformation units, according to an exemplary embodiment.

FIG. 14 is a diagram for describing a relationship between a coding unit 710 and transformation units 720, according to an exemplary embodiment.

The video encoding apparatus 100 or the video decoding apparatus 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 15:
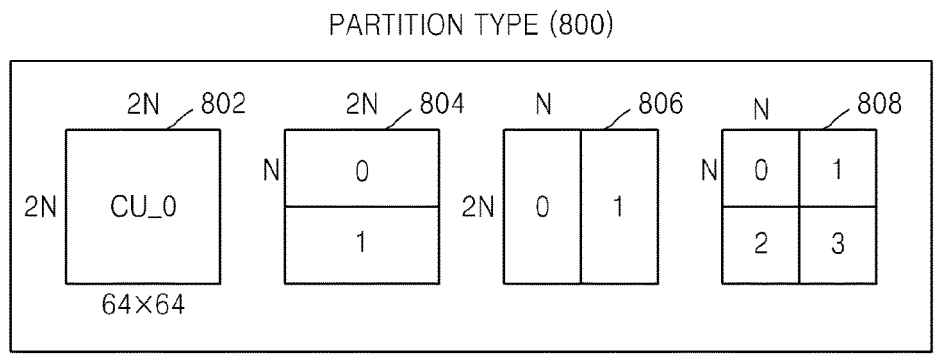
FIG. 15 is a diagram for describing encoding information of coding units corresponding to a coded depth, according to an exemplary embodiment.
Figure 15:
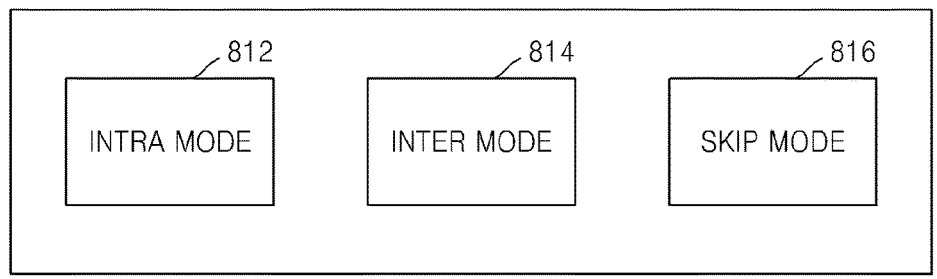
Figure 15:
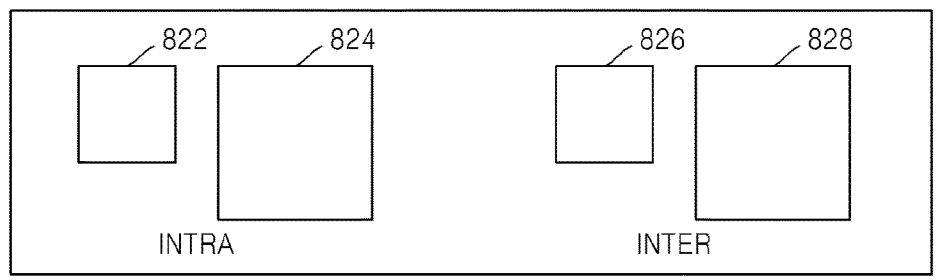

FIG. 15 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, e.g., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

The image data and encoding information extractor 220 of the video decoding apparatus 200 may extract and use the information 800, 810, and 820 for decoding, according to each deeper coding unit.

Figure 16:
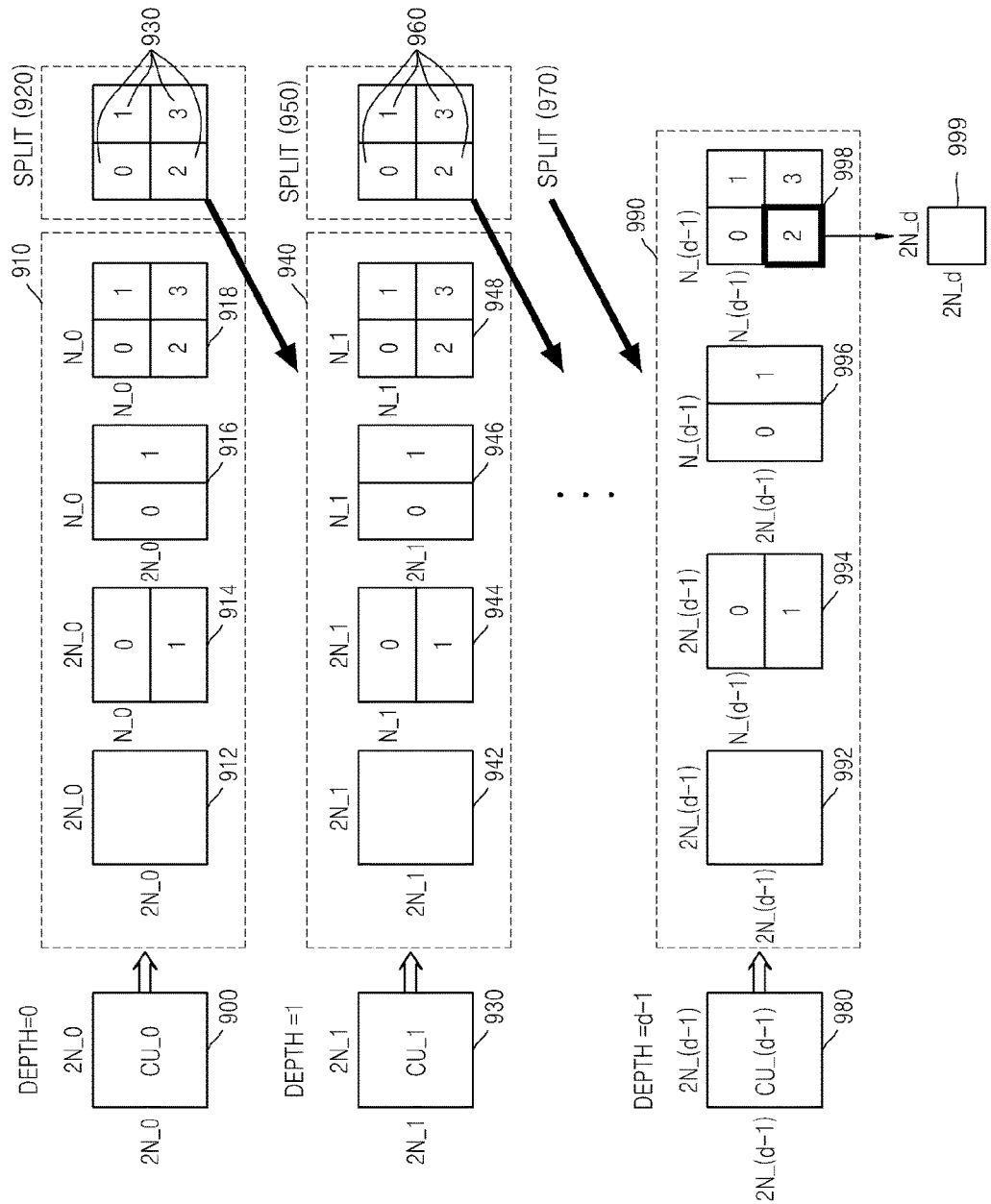
FIG. 16 is a diagram of deeper coding units according to depths, according to an exemplary embodiment.

FIG. 16 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 16 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), and four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a square data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of the coding units having a hierarchical structure in each region of a maximum coding unit to determine an optimum coding unit, and thus, coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

Split Information 0
(Encoding on Coding Unit having Size of 2N × 2N and Current Depth of d)

| Prediction Mode | Partition Type | | Size of Transformation Unit | | Split Information 1 |
|---|---|---|---|---|---|
| | Symmetrical Partition Type | Asymmetrical Partition Type | Split Information 0 of Transformation Unit | Split Information 1 of Transformation Unit | |
| Intra Inter Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | Repeatedly Encode Coding Units having Lower Depth of d + 1 |

Figure 17:
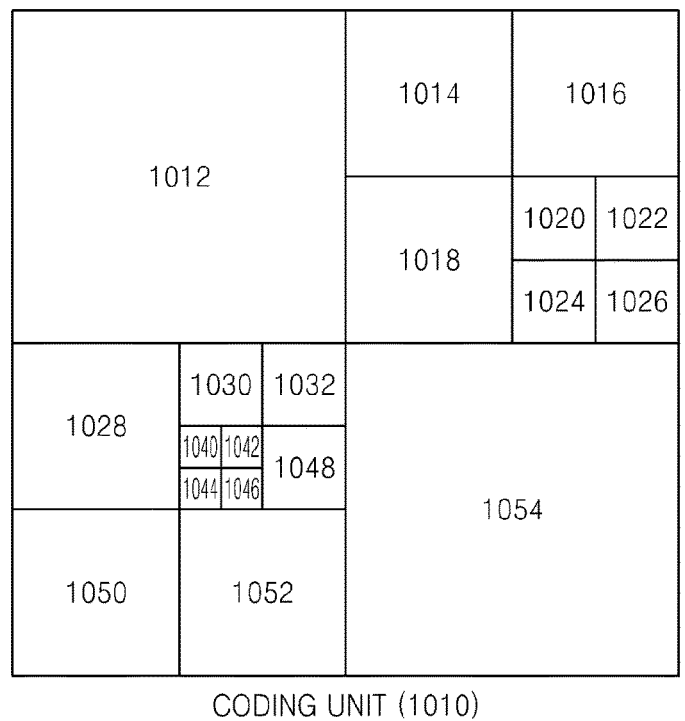
FIGS. 17, 18 and 19 are diagrams for describing a relationship between coding units, prediction units, and transformation units, according to an exemplary embodiment.
Figure 18:
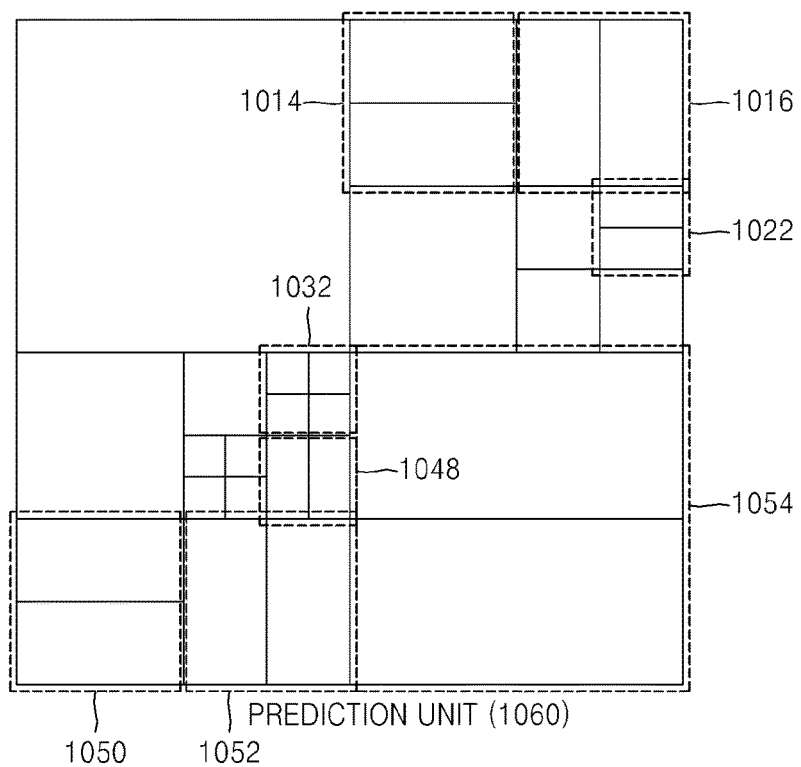
Figure 19:
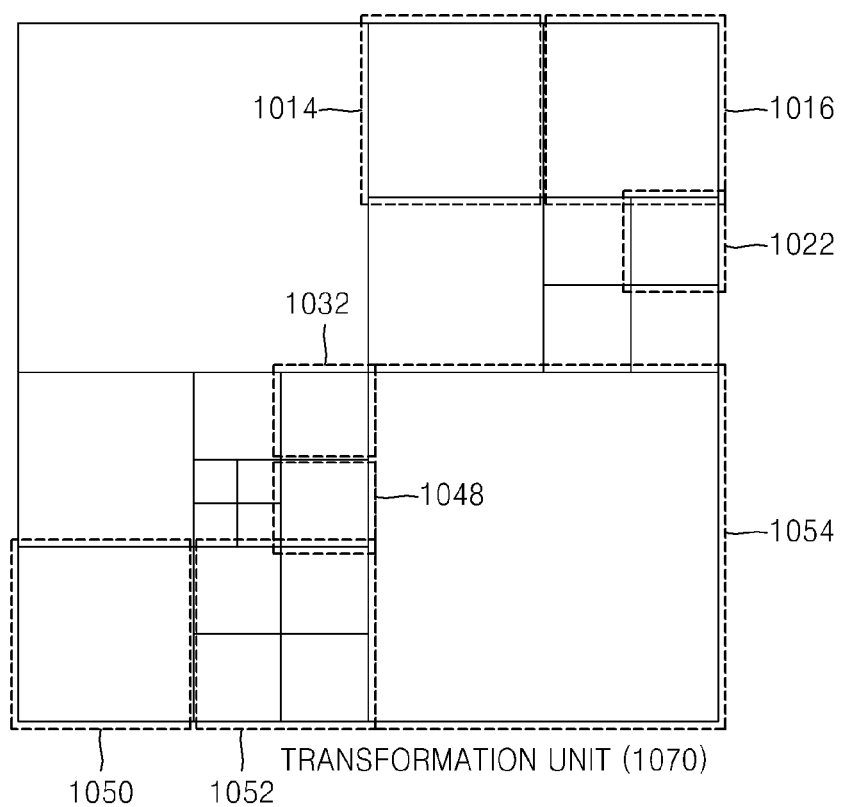

FIGS. 17 through 19 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus, information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode may be defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus, a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred to for predicting the current coding unit.

Figure 20:
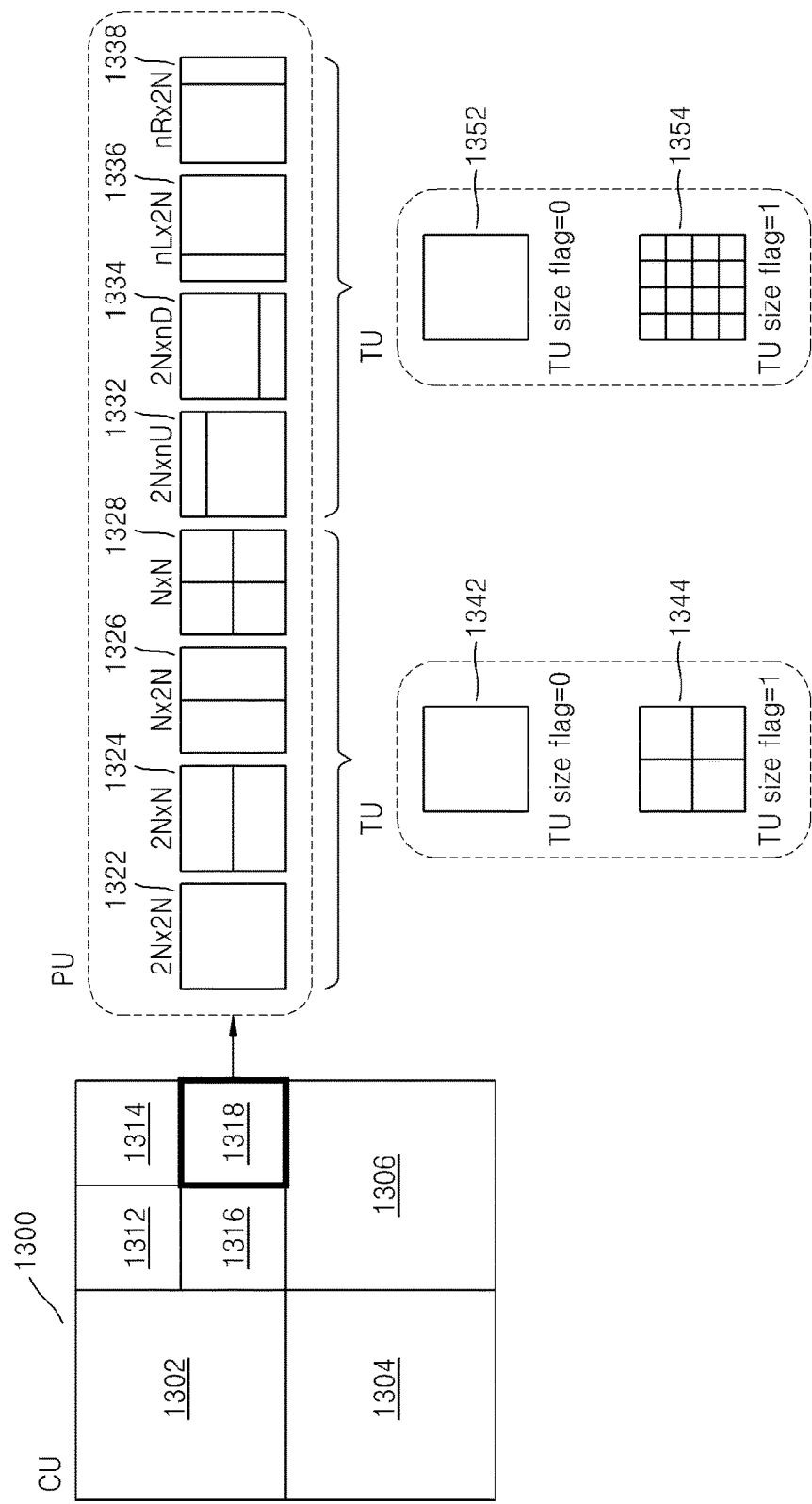
FIG. 20 is a diagram for describing a relationship between a coding unit, a prediction unit, and a transformation unit, according to encoding mode information of Table 1.

FIG. 20 is a diagram for describing a relationship between a coding unit, a prediction unit, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information (TU size flag) of a transformation unit is a type of a transformation index. The size of the transformation unit corresponding to the transformation index may be changed according to a prediction unit type or partition type of the coding unit.

For example, when the partition type is set to be symmetrical, e.g., the partition type 1322, 1324, 1326, or 1328, a transformation unit 1342 having a size of 2N×2N is set if a TU size flag of a transformation unit is 0, and a transformation unit 1344 having a size of N×N is set if a TU size flag is 1.

When the partition type is set to be asymmetrical, e.g., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 20, the TU size flag is a flag having a value or 0 or 1, but the TU size flag is not limited to 1 bit, and a transformation unit may be hierarchically split having a tree structure while the TU size flag increases from 0. Split information (TU size flag) of a transformation unit may be an example of a transformation index.

In this case, the size of a transformation unit that has been actually used may be expressed by using a TU size flag of a transformation unit, according to an exemplary embodiment, together with a maximum size and minimum size of the transformation unit. The video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. The video decoding apparatus 200 may decode a video by using the maximum transformation unit size information, the minimum transformation unit size information, and the maximum TU size flag.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$CurrMinTuSize = \max(MinTransformSize, RootTuSize/(2^{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize=\min(MaxTransformSize, PUSize) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize=\min(MaxTransformSize, PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the exemplary embodiments are not limited thereto.

According to the video encoding method based on coding units having a tree structure as described with reference to FIGS. 8 through 20, image data of a spatial region is encoded for each coding unit of a tree structure. According to the video decoding method based on coding units having a tree structure, decoding is performed for each maximum coding unit to restore image data of a spatial region. Thus, a picture and a video that is a picture sequence may be restored. The restored video may be reproduced by a reproducing apparatus, stored in a storage medium, or transmitted through a network.

The exemplary embodiments may be written as computer programs and may be implemented in general-use digital computers that execute the programs using a computer-readable recording medium. Examples of the computer-readable recording medium include magnetic storage media (e.g., ROM, floppy discs, hard discs, etc.) and optical recording media (e.g., CD-ROMs, or DVDs).

For convenience of description, the video encoding method according to the multiview video prediction method, the multiview video prediction restoration method, or the multiview video encoding method described above with reference to FIGS. 1A through 20 may be collectively referred to as a 'video encoding method according to an exemplary embodiment'. In addition, the video decoding method according to the multiview video prediction restoration method or the multiview video decoding method described above with reference to FIGS. 1A through 20 may be referred to as a 'video decoding method according to an exemplary embodiments'.

Also, a video encoding apparatus including the multiview video encoding apparatus 10, the multiview video decoding apparatus 20, the video encoding apparatus 100, or the image encoder 400, which has been described with reference to FIGS. 1A through 20, may be referred to as a 'video encoding apparatus according to an exemplary embodiment'. In addition, a video decoding apparatus including the multiview video decoding apparatus 20, the video decoding apparatus 200, or the image decoder 500, which has been described above with reference to FIGS. 1A through 20, may be referred to as a 'video decoding apparatus according to an exemplary embodiment'.

A computer-readable recording medium storing a program, e.g., a disc 26000, according to an exemplary embodiment will now be described in detail.

Figure 21:
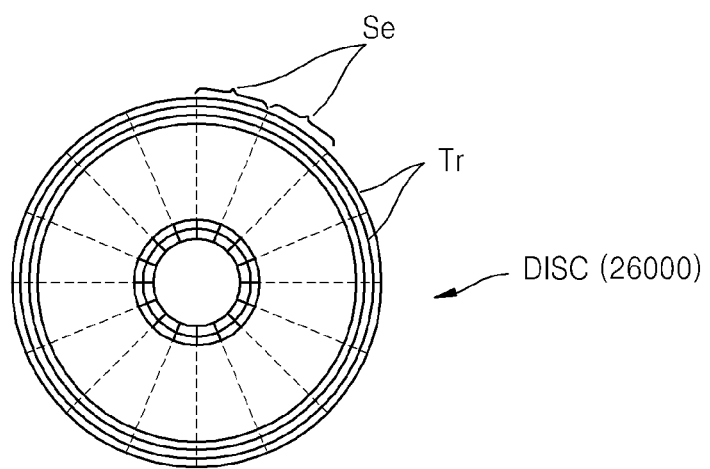
FIG. 21 is a diagram of a physical structure of a disc in which a program is stored, according to an exemplary embodiment.

FIG. 21 is a diagram of a physical structure of the disc 26000 in which a program is stored, according to an exemplary embodiment. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantization parameter determining method, the video encoding method, and the video decoding method described above may be assigned and stored.

A computer system embodied using a storage medium that stores a program for executing the video encoding method and the video decoding method as described above will now be described with reference to FIG. 22.

Figure 22:
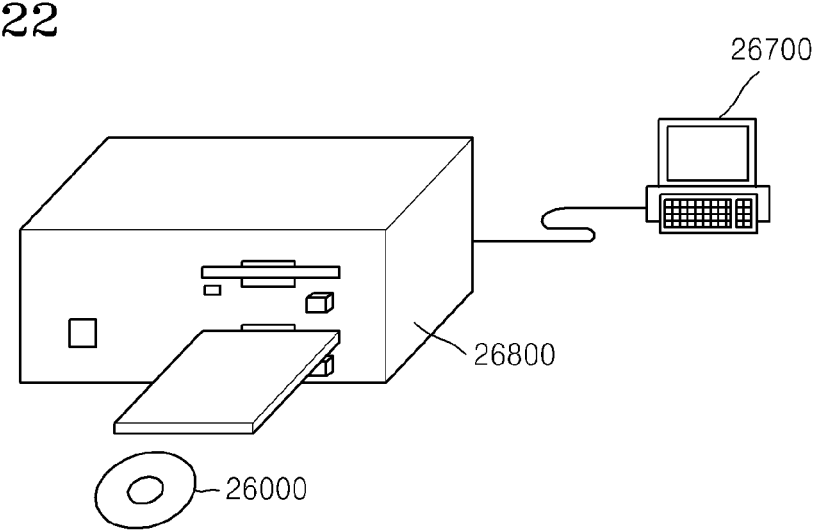
FIG. 22 is a diagram of a disc drive for recording and reading a program by using a disc.

FIG. 22 is a diagram of a disc drive 26800 for recording and reading a program by using the disc 26000. A computer system 26700 may store a program that executes at least one of a video encoding method and a video decoding method according to an exemplary embodiment, in the disc 26000 via the disc drive 26800. To run the program stored in the disc 26000 in the computer system 26700, the program may be read from the disc 26000 and may be transmitted to the computer system 26700 by using the disc drive 26800.

The program that executes at least one of a video encoding method and a video decoding method according to an exemplary embodiment may be stored not only in the disc 26000 illustrated in FIG. 21 or 22 but also in a memory card, a ROM cassette, or a solid state drive (SSD).

A system to which the video encoding method and a video decoding method described above may be implemented will be described below.

Figure 23:
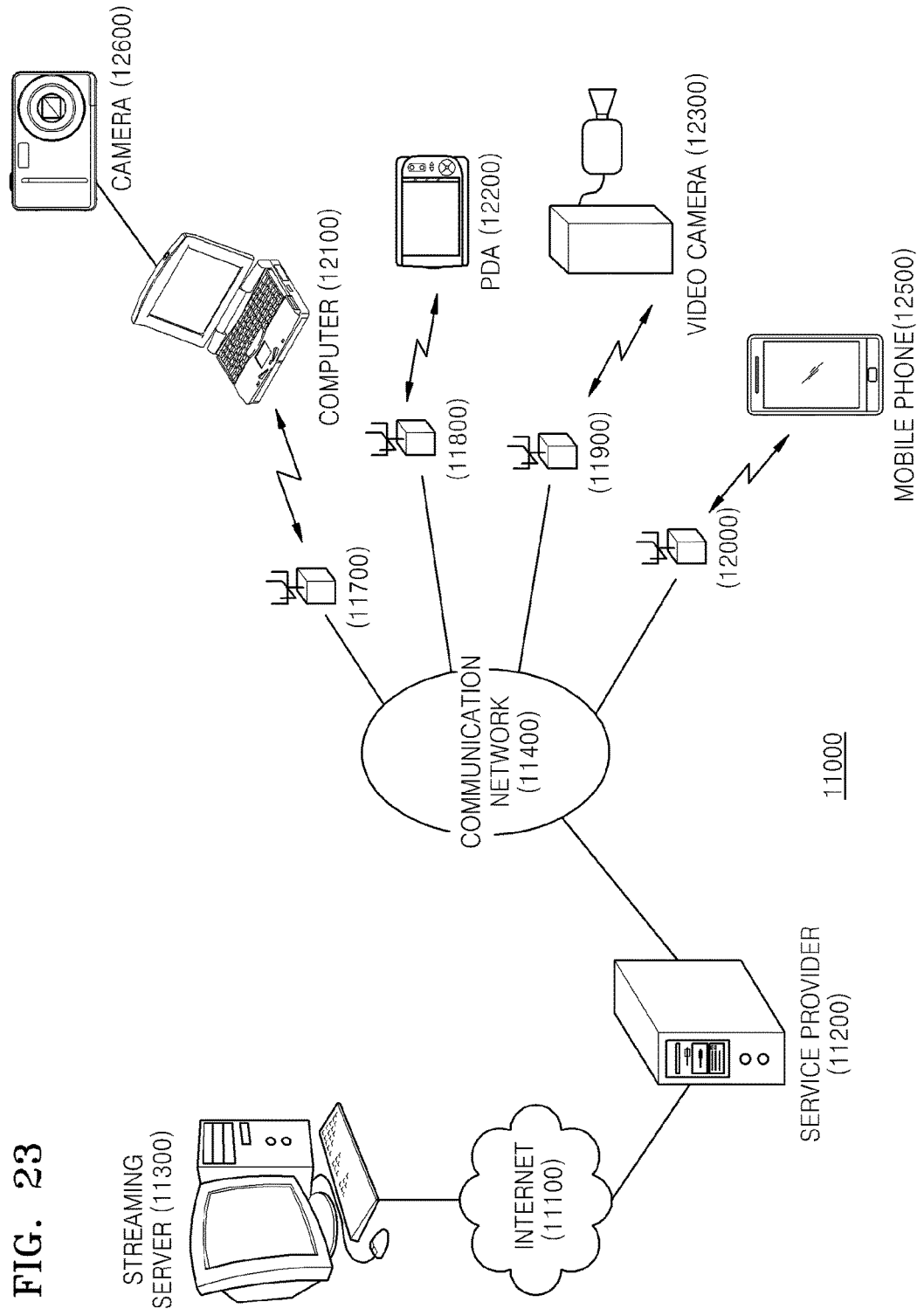
FIG. 23 is a diagram of an overall structure of a content supply system for providing a content distribution service.

FIG. 23 is a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

Figure 24:
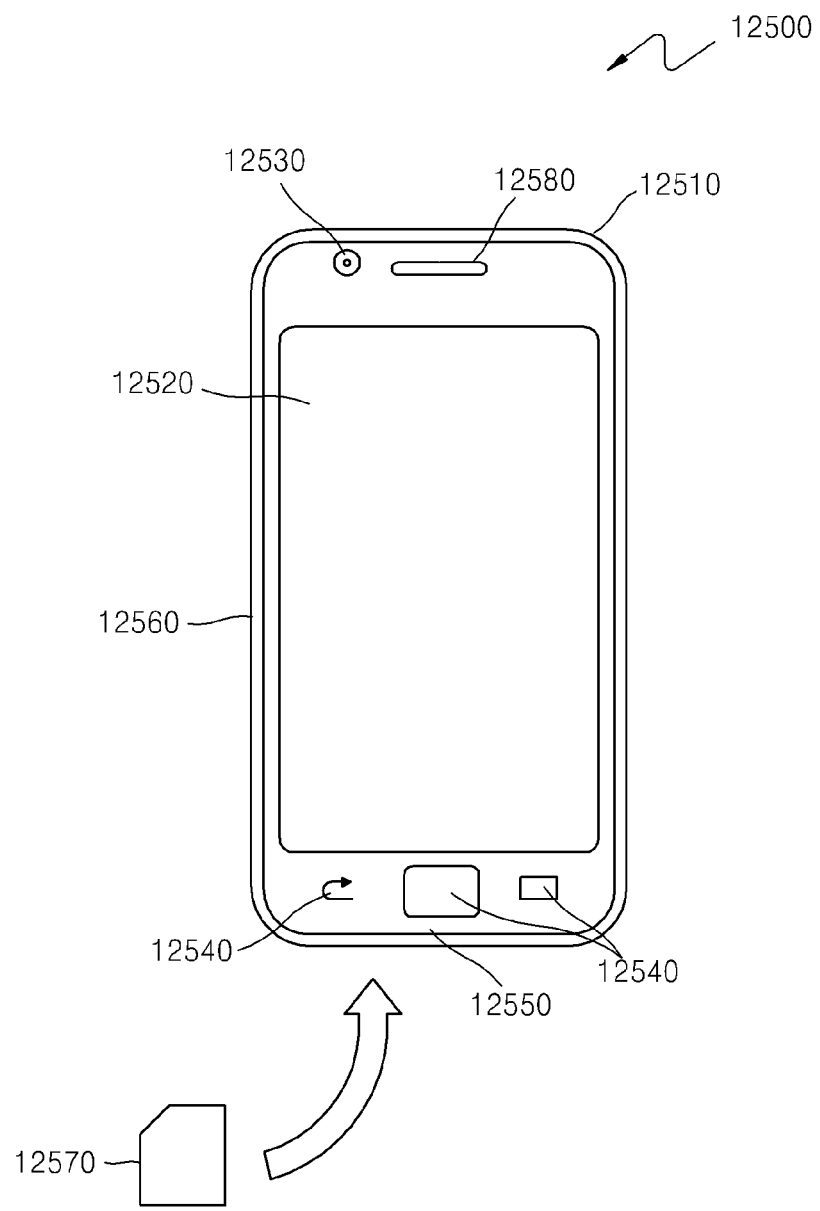
FIGS. 24 and 25 are diagrams respectively of an external structure and an internal structure of a mobile phone to which a video encoding method and a video decoding method are applied, according to an exemplary embodiment.

However, the content supply system 11000 is not limited to the configuration illustrated in FIG. 24, and devices may be selectively connected thereto. The plurality of independent devices may be directly connected to the communication network 11400, instead of being connected via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 enables content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data as a type of streaming content to other clients that request the content data.

The clients are devices capable of decoding the encoded content data, e.g., the computer 12100, the PDA 12200, the video camera 12300, or the mobile phone 12500. Thus, the content supply system 11000 enables the clients to receive and reproduce the encoded content data. Also, the content supply system 11000 enables the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus according to an exemplary embodiment.

The mobile phone 12500 included in the content supply system 11000 according to an exemplary embodiment will now be described in greater detail with referring to FIGS. 24 and 25.

FIG. 24 illustrates an external structure of the mobile phone 12500 to which a video encoding method and a video decoding method are applied, according to an exemplary embodiment. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000 of FIG. 21, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of sound output unit, and a microphone 12550 for inputting voice and sound or another type of sound input unit. The mobile phone 12500 further includes the camera 12530, such as a charge-coupled device (CCD) camera, to capture video and still images. The mobile phone 12500 may further include a storage medium 12570 for storing encoded or decoded data, e.g., video or still images captured by the camera 12530, received via email, or obtained according to various other techniques; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 25:
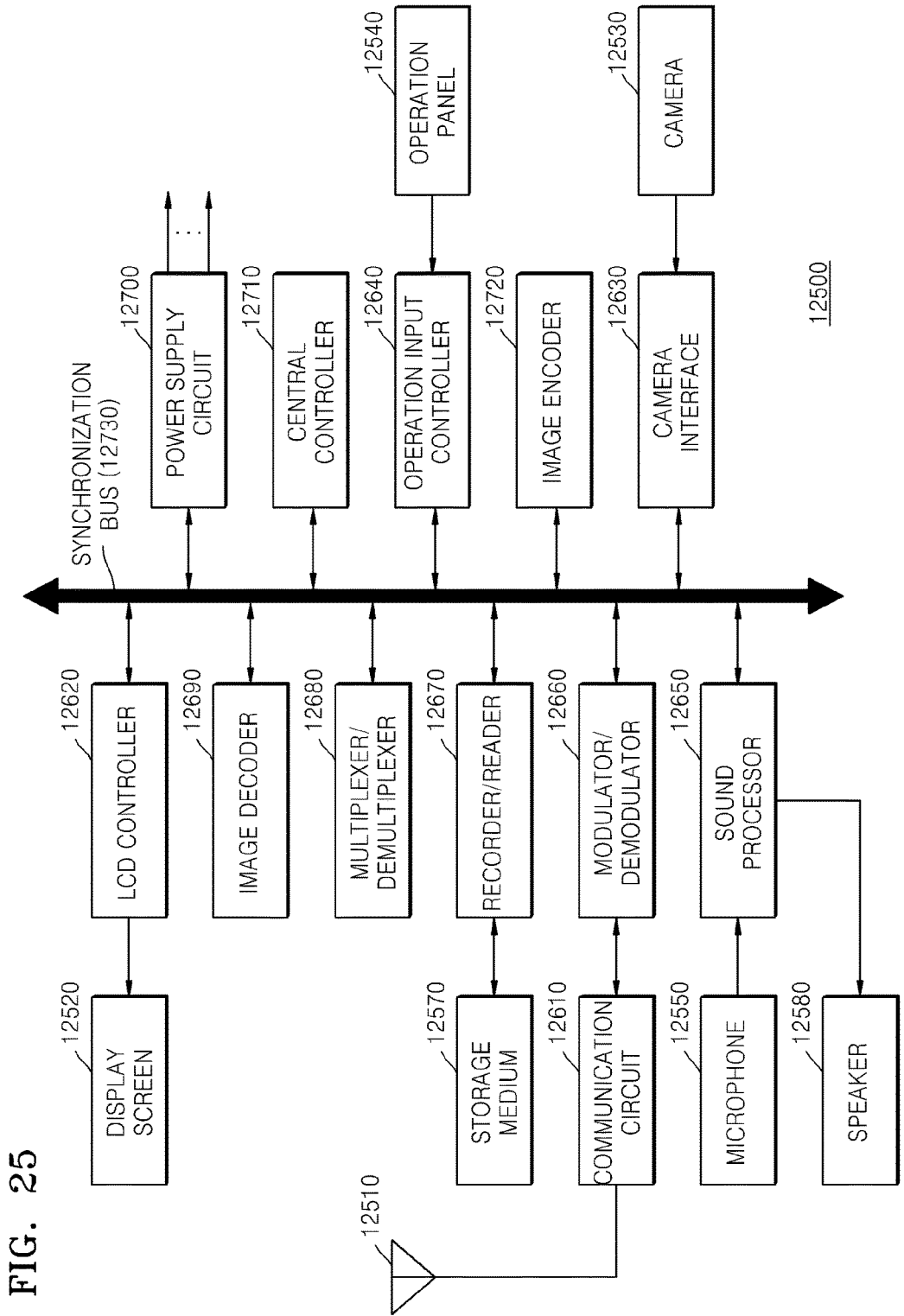

FIG. 25 illustrates an internal structure of the mobile phone 12500, according to an exemplary embodiment. To systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recorder/reader 12670, a modulator/demodulator 12660, and a sound processor 12650 are connected to a central controller 12710 via a synchronization bus 12730.

If a user operates a power button and sets the mobile phone 12500 from a 'power off' state to a 'power on' state, the power supply circuit 12700 supplies power to all the parts of the mobile phone 12500 from a battery pack, thereby setting the mobile phone 12500 in an operation mode.

The central controller 12710 includes a central processing unit (CPU), a ROM, and a RAM.

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulator/demodulator 12660 under control of the central controller 12710, the modulator/demodulator 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, under control of the central controller 12710. The digital sound signal may be transformed into a transformation signal via the modulator/demodulator 12660 and the communication circuit 12610, and may be transmitted via the antenna 12510.

When a text message, e.g., email, is transmitted in a data communication mode, text data of the text message is input via the operation panel 12540 and is transmitted to the central controller 12710 via the operation input controller 12640. Under control of the central controller 12710, the text data is transformed into a transmission signal via the modulator/demodulator 12660 and the communication circuit 12610 and is transmitted to the wireless base station 12000 via the antenna 12510.

To transmit image data in the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to a structure of the video encoding apparatus 100 described above. The image encoder 12720 may transform the image data received from the camera 12530 into compressed and encoded image data according to the video encoding method described above, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulator/demodulator 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulator/demodulator 12660 modulates a frequency band of the digital signal. The frequency-band modulated digital signal is transmitted to the image decoder 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulator/demodulator 12660 and the sound processor 12650, and the analog sound signal is output via the speaker 12580, under control of the central controller 12710.

When in the data communication mode, data of a video file accessed externally (e.g., at an Internet website) is received, a signal received from the wireless base station 12000 via the antenna 12510 is output as multiplexed data via the modulator/demodulator 12660, and the multiplexed data is transmitted to the multiplexer/demultiplexer 12680.

To decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the image decoder 12690 and the sound processor 12650, respectively.

A structure of the image decoder 12690 may correspond to that of the video decoding apparatus 200 described above. The image decoder 12690 may decode the encoded video data to obtain restored video data and provide the restored video data to the display screen 12520 via the LCD controller 12620, according to a video decoding method employed by the video decoding apparatus 200 or the image decoder 500 described above.

Thus, the data of the video file accessed externally (e.g., at the Internet website) may be displayed on the display screen 12520. At the same time, the sound processor 12650 may transform audio data into an analog sound signal, and provide the analog sound signal to the speaker 12580. Thus, audio data contained in the video file accessed externally (e.g., at the Internet website) may also be reproduced via the speaker 12580.

The mobile phone 12500 or another type of communication terminal may be a transceiving terminal including both a video encoding apparatus and a video decoding apparatus according to an exemplary embodiment, may be a transceiving terminal including only the video encoding apparatus according to an exemplary embodiment, or may be a transceiving terminal including only the video decoding apparatus according to an exemplary embodiment.

Figure 26:
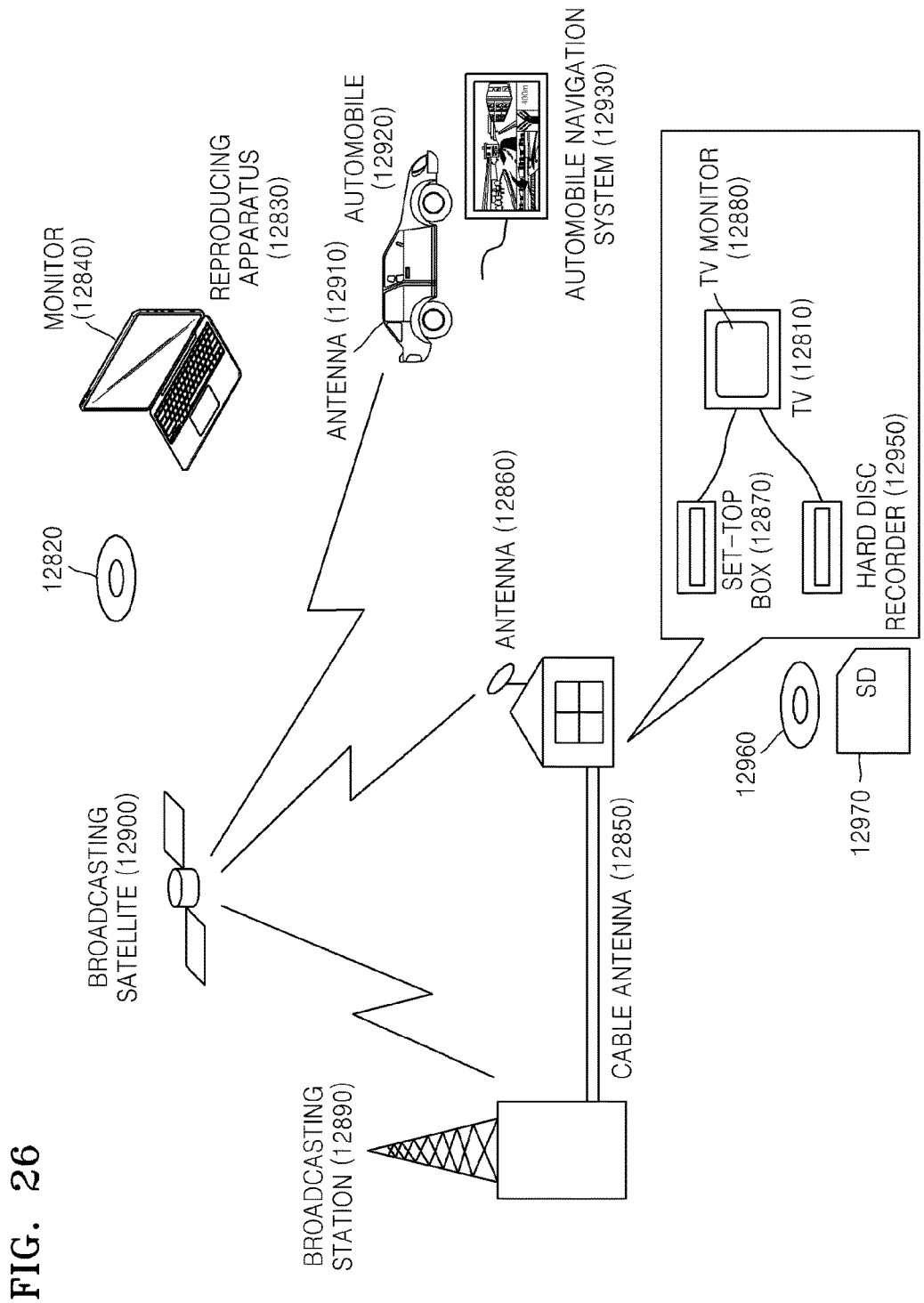
FIG. 26 is a diagram of a digital broadcast system to which a communication system is applied, according to an exemplary embodiment.

A communication system according to the exemplary embodiments is not limited to the communication system described above with reference to FIG. 23. For example, FIG. 26 illustrates a digital broadcasting system employing a communication system, according to an exemplary embodiment. The digital broadcasting system of FIG. 26 may receive a digital broadcast transmitted via a satellite or a terrestrial network by using a video encoding apparatus and a video decoding apparatus according to an exemplary embodiment.

Specifically, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When a video decoding apparatus according to an exemplary embodiment is implemented in a reproducing apparatus 12830, the reproducing apparatus 12830 may parse and decode an encoded video stream recorded on a storage medium 12820, such as a disc or a memory card, to restore digital signals. Thus, the restored video signal may be reproduced, for example, on a monitor 12840.

In the set-top box 12870 connected to the antenna 12860 for a satellite/terrestrial broadcast or a cable antenna 12850 for receiving a cable television (TV) broadcast, a video decoding apparatus according to an exemplary embodiment may be installed. Data output from the set-top box 12870 may also be reproduced on a TV monitor 12880.

As another example, a video decoding apparatus according to an exemplary embodiment may be installed in the TV receiver 12810 instead of the set-top box 12870.

An automobile 12920 that has an appropriate antenna 12910 may receive a signal transmitted from the satellite 12900 or the wireless base station 11700 of FIG. 23. A decoded video may be reproduced on a display screen of an automobile navigation system 12930 installed in the automobile 12920.

A video signal may be encoded by a video encoding apparatus according to an exemplary embodiment and may then be stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus according to an exemplary embodiment, a video signal recorded on the DVD disc 12960, the SD card 12970, or another storage medium may be reproduced on the TV monitor 12880.

The automobile navigation system 12930 may not include the camera 12530, the camera interface 12630, and the image encoder 12720 of FIG. 26. For example, the computer 12100 and the TV receiver 12810 may not be included with the camera 12530, the camera interface 12630, and the image encoder 12720 of FIG. 25.

Figure 27:
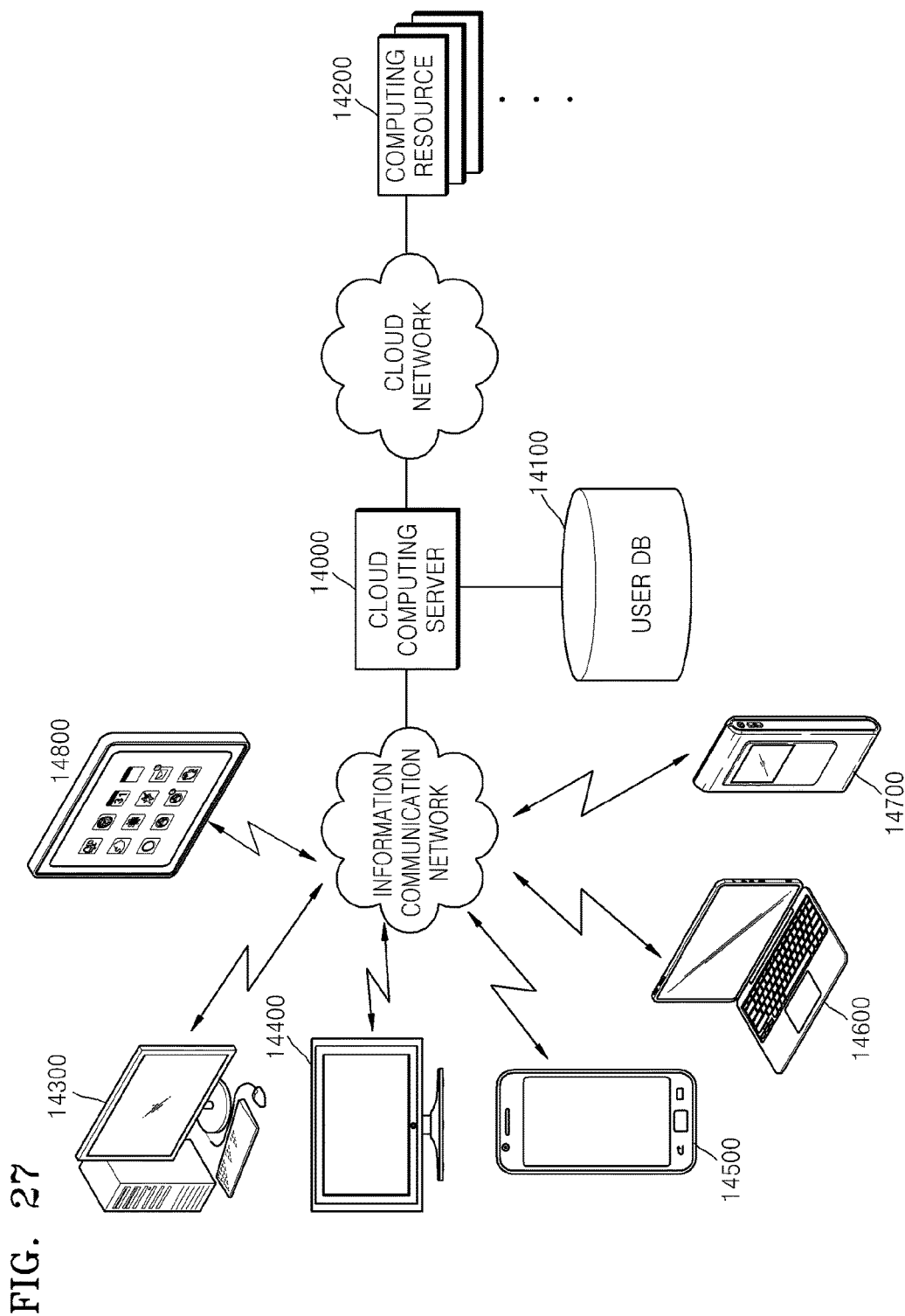
FIG. 27 is a diagram illustrating a network structure of a cloud computing system using a video encoding apparatus and a video decoding apparatus, according to an exemplary embodiment.

FIG. 27 is a diagram illustrating a network structure of a cloud computing system using a video encoding apparatus and a video decoding apparatus, according to an exemplary embodiment.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his or her own terminal in order to use the computing resources, but instead, may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided with cloud computing services, and particularly, with video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video databases distributed in different regions according to the virtualization technology.

User information about users who have subscribed for a cloud computing service is stored in the user DB 14100. The user information may include login information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14000 searches for and reproduces the video service, based on the user DB 14100. When the smart phone 14500 receives a video data stream from the cloud computing server 14000, a process of reproducing a video by decoding the video data stream is similar to an operation of reproducing a video by the mobile phone 12500 as described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If the video was being reproduced, then a method of streaming the video, performed by the cloud computing server 14000, may vary according to the request from the user terminal, e.g., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include a video decoding apparatus as described above with reference to FIGS. 1A to 20. As another example, the user terminal may include a video encoding apparatus as described above with reference to FIGS. 1A to 20. Alternatively, the user terminal may include both the video decoding apparatus and the video encoding apparatus as described above with reference to FIGS. 1A to 20.

Various applications of a video encoding method, a video decoding method, a video encoding apparatus, and a video decoding apparatus according to exemplary embodiments described above with reference to FIGS. 1A to 20 have been described above with reference to FIGS. 21 to 27. However, methods of storing the video encoding method and the video decoding method in a storage medium or methods of implementing the video encoding apparatus and the video decoding apparatus in a device, according to various exemplary embodiments, are not limited to the exemplary embodiments described above with reference to FIGS. 21 to 27.

While the exemplary embodiments have been particularly shown and described with reference to certain exemplary embodiments thereof, it will be understood by those of ordinary skill in the art that various changes in form and details may be made therein without departing from the spirit and scope of the exemplary embodiments as defined by the appended claims. The exemplary embodiments should be considered in a descriptive sense only and not for purposes of limitation. Therefore, the scope of the exemplary embodiments is defined not by the detailed description of the exemplary embodiments but by the appended claims, and all differences within the scope will be construed as being included in the exemplary embodiments.

The invention claimed is:

1. A multiview video decoding method comprising:

obtaining a base view image stream and an additional view image stream;

reconstructing an anchor picture of a base view that is a first random access image and an I-picture type image, by decoding the base view image stream;

reconstructing an image of the base view that precedes, in a display order, the anchor picture of the base view and follows, in a decoding order, the anchor picture of the base view by decoding the base view image stream, wherein the reconstructing of the image of the base view includes performing motion compensation by referring to an image of the base view in a reference picture buffer, and the image of the base view in the reference picture buffer precedes, in the decoding order, the anchor picture of the base view;

reconstructing a first anchor picture of an additional view that is a second random access image, wherein the reconstructing of the first anchor picture of the additional view includes performing disparity compensation by referring to the reconstructed anchor picture of the base view, by decoding the additional view image stream;

determining each of a plurality of images of the additional view in the reference picture buffer to be unused for reference in the additional view, wherein the each of the plurality of images of the additional view precedes, in the decoding order, the first anchor picture of the additional view, according to the reconstructing of the first anchor picture of the additional view; and reconstructing an image of the additional view that precedes, in the display order, the first anchor picture of the additional view and follows, in the decoding order, the first anchor picture of the additional view, by decoding the additional view image stream, wherein the reconstructing of the image of the additional view includes performing disparity compensation by referring to a reconstructed base view image and performing motion compensation by referring to a reconstructed additional view image except for the each of the plurality of images of the additional view in the reference picture buffer that are determined to be unused for reference, wherein the each of the plurality of images of the additional view in the reference picture buffer that are determined to be unused for reference includes a second anchor picture of the additional view.

* * * * *